US012667516B2

(12) United States Patent
Liu et al.

(10) Patent No.: US 12,667,516 B2
(45) Date of Patent: Jun. 30, 2026

(54) STIMULATION DEVICE INCLUDING A PRESSURE FIELD GENERATOR AND AIR PASSAGE

(71) Applicant: HYTTO PTE. LTD., Singapore (SG)

(72) Inventors: Dan Liu, Guangdong (CN); Jilin Qiu, Guangdong (CN); Zhiwen Wu, Guangdong (CN); Peisen Wu, Guangdong (CN)

(73) Assignee: HYTTO PTE. LTD., Singapore (SG)

(*) Notice: Subject to any disclaimer, the term of this patent is extended or adjusted under 35 U.S.C. 154(b) by 0 days.

(21) Appl. No.: 19/314,468

(22) Filed: Aug. 29, 2025

(65) Prior Publication Data

US 2026/0174621 A1 Jun. 25, 2026

Related U.S. Application Data

(60) Provisional application No. 63/736,235, filed on Dec. 19, 2024.

(51) Int. Cl.

*A61H 19/00* (2006.01)
*A61H 9/00* (2006.01)

(52) U.S. Cl.

CPC ........... *A61H 19/34* (2013.01); *A61H 9/0057* (2013.01); *A61H 2201/0153* (2013.01); *A61H 2201/1215* (2013.01)

(58) Field of Classification Search

CPC ............ A61H 19/00–50; A61H 9/0057; A61H 2201/0153; A61H 2201/1215;

(Continued)

(56) References Cited

U.S. PATENT DOCUMENTS

| | | | | |
|---|---|---|---|---|
| 5,725,473 A | 3/1998 | Taylor | | |
| 7,530,944 B1 * | 5/2009 | Kain | .................. | A61H 23/0263 600/38 |

(Continued)

FOREIGN PATENT DOCUMENTS

| | | | | |
|---|---|---|---|---|
| CN | 111419660 A * | 7/2020 | ............. | A61H 19/40 |
| EP | 3988071 A1 | 4/2022 | | |
| FR | 2746639 A1 | 10/1997 | | |

OTHER PUBLICATIONS

CN-111419660-A description (Year: 2020).*
Machine Translation of FR 2746639, 4 pages.
Translation of EP 3988071, 17 pages.

*Primary Examiner* — Bradley H Philips
*Assistant Examiner* — Kira B Daher
(74) *Attorney, Agent, or Firm* — F. CHAU & ASSOCIATES, LLC

(57) ABSTRACT

A sexual stimulation device includes a pressure field generator including a first opening configured to stimulate an erogenous zone of a user's body. A cavity is in fluid communication with the first opening. A tube extends from the cavity. The cavity and the tube together form an airflow channel extending substantially linearly through the pressure field generator from the first opening to an exterior of the sexual stimulation device. A drive unit is coupled to the pressure field generator and is configured to change a volume of the airflow channel and generate alternating pressure variations relative to an ambient pressure at the first opening so as to provide pneumatic pulse stimulation to the erogenous zone of the user's body.

31 Claims, 21 Drawing Sheets

(58) Field of Classification Search
CPC .............. A61H 2009/0064; A61H 9/00; A61H 9/005–0078; A61H 7/008; A61H 2201/123
USPC .................................................. 600/38; 601/9
See application file for complete search history.

(56) References Cited

U.S. PATENT DOCUMENTS

| | | | | |
|---|---|---|---|---|
| 9,849,061 | B2 | 12/2017 | Lenke | |
| 11,007,110 | B1 * | 5/2021 | Zhou | A61H 23/0263 |
| 12,324,784 | B2 | 6/2025 | Liu et al. | |
| 2014/0046127 | A1 | 2/2014 | Topolovac et al. | |
| 2016/0354277 | A1 | 12/2016 | Fima | |
| 2017/0065483 | A1 * | 3/2017 | Lenke | A61H 19/30 |
| 2018/0125742 | A1 * | 5/2018 | Melnikoff | A61H 9/0057 |
| 2019/0015291 | A1 * | 1/2019 | Sedic | A61H 19/34 |
| 2023/0172793 | A1 * | 6/2023 | Witt | A61H 19/34 600/38 |
| 2023/0210717 | A1 * | 7/2023 | Witt | A61H 19/34 600/38 |

* cited by examiner

STIMULATION DEVICE INCLUDING A PRESSURE FIELD GENERATOR AND AIR PASSAGE

CROSS-REFERENCE TO RELATED APPLICATION

The present application is based on provisional application Ser. No. 63/736,235, filed Dec. 19, 2024, the entire contents of which are herein incorporated by reference.

TECHNICAL FIELD

The present disclosure relates to sexual stimulation devices and, more specifically, to a simulation device including a pressure field generator and an air passage.

DISCUSSION OF THE RELATED ART

Sexual stimulation devices are designed to provide stimulation to an erogenous zone of a user. Various different types of sexual stimulation devices have been made, including those that provide vibration, pulsation, and insertion. Other sexual stimulation devices provide a sucking sensation that may be sustained or intermittent. This sucking sensation may be provided by a pressure field generator that is configured to generate negative pressure, in an intermittent manner, or in an alternating manner with a positive pressure (e.g., to provide both a sucking and blowing sensation).

Pressure field generators, however, when providing negative pressure to a user, may be exposed to ambient conditions such as moisture and bodily secretions that may make it difficult to protect the internal mechanisms of the device and to allow for good hygienic cleaning between uses.

SUMMARY

A sexual stimulation device includes a pressure field generator including a first opening configured to stimulate an erogenous zone of a user's body. A cavity is in fluid communication with the first opening. A tube extends from the cavity. The cavity and the tube together form an airflow channel extending substantially linearly through the pressure field generator from the first opening to an exterior of the sexual stimulation device. A drive unit is coupled to the pressure field generator and is configured to change a volume of the airflow channel and generate alternating pressure variations relative to an ambient pressure at the first opening so as to provide pneumatic pulse stimulation to the erogenous zone of the user's body.

The airflow channel may be configured to produce a maximum positive pressure alternating with a minimum negative pressure and an absolute value of the minimum negative pressure may be greater than an absolute value of the maximum positive pressure.

The airflow channel may include a check valve configured to permit airflow substantially unidirectionally from within the airflow channel toward the exterior of the sexual stimulation device.

The first opening may be disposed at a first end of the airflow channel and the check valve may be detachably disposed at a second region of the airflow channel, opposite to the first end of the airflow channel.

The check valve may include an adjustable mechanism disposed along an outer periphery thereof and may be configured to regulate an amount of air discharged from within the airflow channel to the exterior of the sexual stimulation device though the check valve.

The check valve may include a notch through which fluid flows from within the airflow channel to the exterior of the sexual stimulation device.

A handle may enclose the drive unit. The airflow channel may extend in a direction substantially perpendicular to a longitudinal axis of the handle.

A handle may be proximate to the pressure field generator. The airflow channel may extend in a direction that forms an angle with a longitudinal axis of the handle.

The drive unit may be an electromagnetic drive mechanism including one or more coils and a magnetic ring may be configured to move in response to a magnetic field generated by the one or more coils so as to vary a volume of the airflow channel.

The magnetic ring may circumscribe the airflow channel, and the one or more coils may be arranged circumferentially around the magnetic ring and positioned outside the airflow channel.

The airflow channel may include a first end region including the first opening and a second end region accommodating a stimulation tip. The stimulation tip may be supported by a flexible base disposed at the second end region. The drive unit may be further configured to drive the stimulation tip to pulsate while changing the volume of the airflow channel.

The stimulation tip may include a check valve.

The drive unit may include a rotary motor having an output shaft. A connecting rod may have a first end that is coupled to the tube of the airflow channel. A crankshaft may connect the output shaft of the rotary motor to a second end of the connecting rod.

A guide may constrain the tube to move in a linear reciprocating motion.

The airflow channel may be configured to receive insertion of a penis of the user.

The first opening of the pressure field generator may be configured to receive a clitoris of the user.

The check valve may be positioned at a location that is spaced apart from the first opening, rather than adjacent to the first opening.

A cross-sectional area of the airflow channel may change along its axial direction. A cross-sectional area of the airflow channel may change at a junction between the cavity and the tube of the pressure field generator, the change in the cross-sectional area being a discontinuous change having a horn shape.

The horn shape of the airflow channel may be configured to modulate airflow characteristics within the airflow channel by altering flow velocity generated by volume changes in the airflow channel, thereby focusing airflow pulses toward the first opening to intensify stimulation at the erogenous zone of the user's body.

The check valve may include a conical port structure configured to permit unidirectional airflow from within the airflow channel to the exterior of the sexual stimulation device.

The check valve may be replaceable.

The drive unit may be configured to move the tube towards and away from the cavity so as to reduce and enlarge a volume of the cavity and thereby create an alternating positive and negative field at the first opening of the cavity.

A sexual stimulation device includes a head unit including a flexible internal wall defining a cavity therein. A rigid tube is connected to the flexible internal wall and is in fluid communication with the cavity. A drive unit moves the rigid tube into and away from the cavity so as to reduce and enlarge a volume of a cavity and thereby create an alternating pressure field at an opening of the cavity, opposite to where it contacts the rigid tube, that is configured to receive an erogenous zone of a user's body.

A check valve may be disposed at an end of the rigid tube opposite to where it contacts the cavity to allow air to exit therethrough but not enter therethrough.

The flexible internal wall of the head unit may extend to wrap around an exterior of the head unit.

The flexible internal wall of the head unit may extend to line an interior of the rigid tube.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1A:
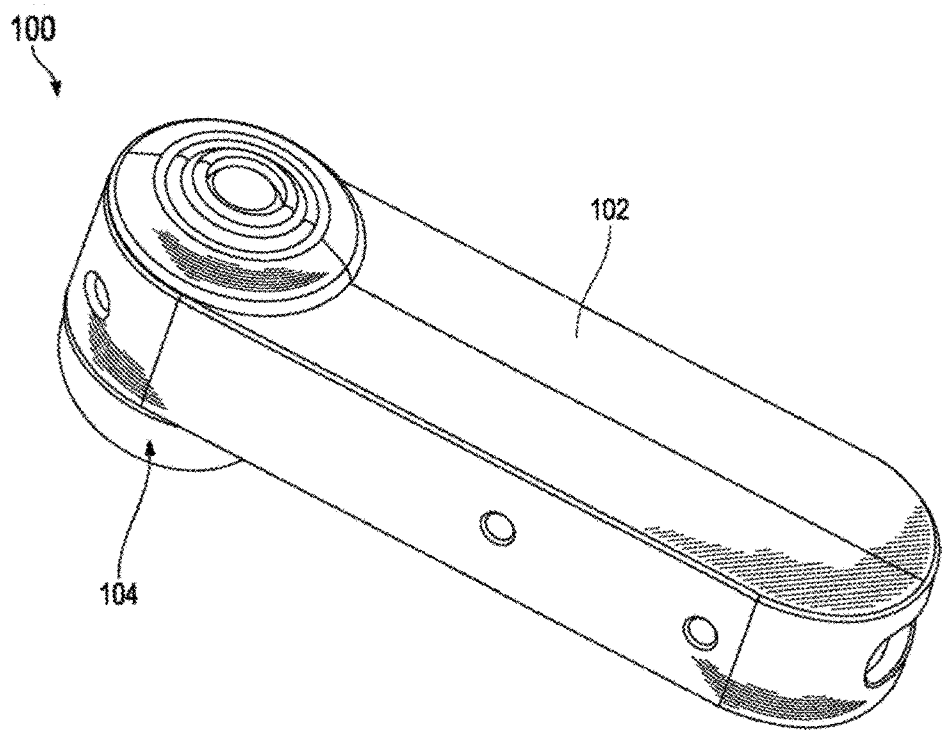
FIG. 1A is a perspective bottom-up view of a stimulation device in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure relate to a highly configurable sexual stimulation device designed to generate dynamic pneumatic stimulation through alternating pressure variations. Such devices may be referred to as clitoral sucking toys.

Some clitoral sucking toys, such as those disclosed in U.S. Pat. No. 10,857,063, which is hereby incorporated by reference herein in its entirety, may provide modulation of positive and negative pressure by changing a volume of a flexible chamber having a single opening. Other clitoral sucking toys, such as those disclosure in US Patent Pub. No. 2023/0210717, which is hereby incorporated by reference herein in its entirety, may allow for an increase in the pressure effect by including a one way valve on a sidewall of the device adjacent to the opening of the chamber.

However, embodiments of the present invention may provide an open air channel between the opening that makes contact with the body of the user, for example, at a stimulation tip, and an opening on the reverse of the device. Such a device addresses shortcomings in prior art by offering precise control, enhanced ergonomics, ease of cleaning, and adaptable stimulation suitable for different anatomical features, including the clitoris, nipples, or penis.

According to some embodiments of the present disclosure, the stimulation tip may be configured to pulsate independently of the action of the pressure field generator.

Embodiments of the present disclosure may include a housing, a pressure field generator, and a drive unit. The pressure field generator includes a suction portion with a cavity connected to a first opening, a tubular component with an internal channel, and a flexible base component. Together, these form a continuous airflow channel extending from the first opening, which is configured to engage an erogenous zone of the user's body, to a check valve at the opposite end. The airflow channel may be linear and may facilitate unidirectional air movement from the cavity interior to the exterior, thereby producing negative pressure (e.g., suction) sensations. The check valve may be detachable for hygienic cleaning and may optionally include an adjustable mechanism to vary suction intensity.

Means for adjusting both the suction intensity and blowing intensity may be instantiated as one or more adjuster units that can be configured to adjust an amount of air in and out of the internal channel, for example, by adjusting a degree to which intake and venting valves are opened and closed. These adjustors may be disposed on an external surface of a housing of the device and may be rotated to open/close the associated valves.

The fact that the airflow channel may be linear, and concentric with the cavity, allows for air to flow through a single channel of the device while allowing for simplified cleaning and adaptability to a myriad of configurations.

The drive unit may actuate changes in the cavity's volume, generating the alternating pressure pulses responsible for sexual stimulation. Different embodiments achieve this through various actuation mechanisms: a crankshaft driven by a rotary motor (e.g., a stepper motor), an electromagnetic drive with coil elements and a magnetic ring, or a screw-and-nut assembly that enables linear reciprocating motion. These mechanisms deform the flexible cavity structure to cyclically reduce and expand its volume, thereby creating a pressure wave that stimulates sensitive areas when the first opening is placed against the body.

As the cavity's volume changes, the pressure so-generated may take the form of a sine wave in which there is an alternating between positive pressure and negative pressure. It is noted that this sine wave may be skewed so that the maximum amplitude is just a little bit above ambient pressure and the minimum amplitude is well below ambient pressure. In this way, the device may provide only a slight positive pressure at its maximum but may then provide a more significant negative pressure at its minimum thereby being skewed towards sucking.

Put another way, an absolute value of the minimum negative pressure is greater than an absolute value of the maximum positive pressure, thereby predominantly producing pneumatic pulse stimulation to the erogenous zone of the user's body, rather than a strong blowing sensation (although a relatively weak blowing sensation may be provided to heighten sexual stimulation).

For example, the maximum positive pressure may be on the order of 20 to 100 Pascals above ambient pressure while the minimum negative pressure may be on the order of −1000 to −5000 Pascals.

Several variations of the device accommodate user needs. For example, one design includes a flexible bellows-based head unit capable of expanding and contracting under actuation. The bellows may be substantially impermeable and easy to clean. Another variant features a cavity that can accommodate direct penile insertion, with stimulation achieved via internal pulsation. The device may also include Wi-Fi and/or Bluetooth connectivity to offer remote control via a locally paired smartphone, or over the Internet, either via a host device or directly, adding to its versatility.

Materials used in construction are selected for safety and comfort. Components that come into contact with the body, such as the suction surface and bellows, may be made of biocompatible, soft, and resilient materials like silicone, thermoplastic elastomer (TPE), thermoplastic rubber (TPR), and/or borosilicate glass, while structural parts may include acrylonitrile butadiene styrene (ABS) plastic or stainless steel.

The device is designed to be ergonomic, with a handheld body shaped for secure grip, that may be enhanced with textured surfaces. Orientation of the airflow channel relative to the handle can vary (e.g., may be transverse, angled, or longitudinal) offering design flexibility. The device's modularity, customizability in suction force, and diverse mechanical implementations distinguish it from prior art and enhance its effectiveness and user satisfaction.

Figure 1B:
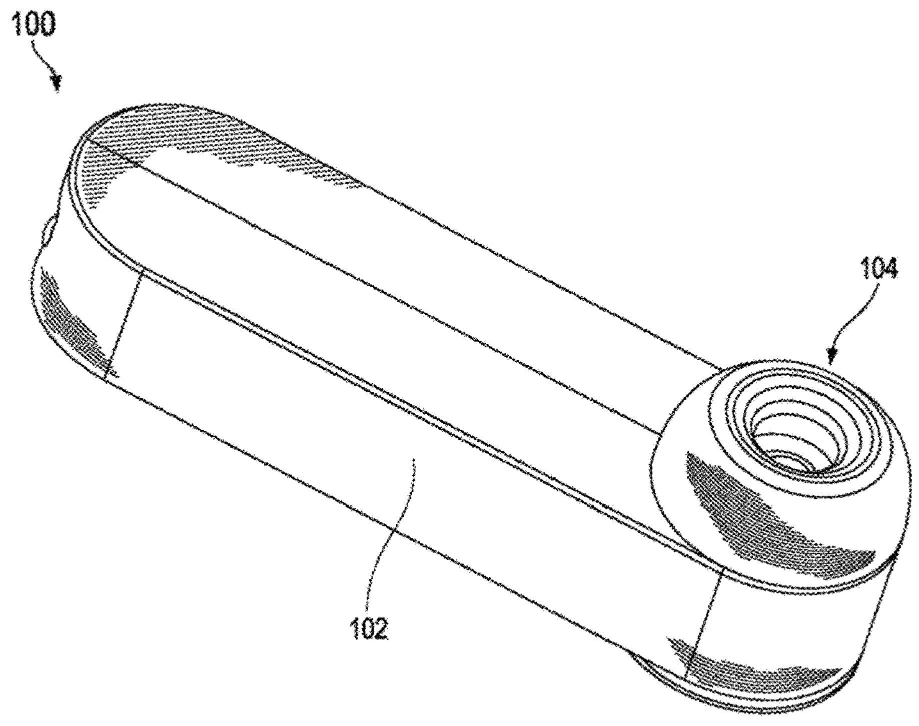
FIG. 1B is a perspective top-down view of the stimulation device of FIG. 1A.

FIG. 1A is a perspective bottom-up view of a stimulation device 100 in accordance with exemplary embodiments of the present disclosure. FIG. 1B is a perspective top-down view of the stimulation device 100 of FIG. 1A. As can be seen in FIG. 1A, the stimulation device 100 includes a body 102 as well as a head element 104. The body 102 may be an elongated structure for enclosing the mechanical elements of the stimulation device 100 while providing a handle for allowing the user to establish a grip on the stimulation device 100. The body 102 may be made of a hard plastic shell and may be covered in a synthetic rubber for added grip ability. The body 102 may also be made substantially waterproof either as a result of the synthetic rubber coating or by the use of various rubber gaskets between body panels.

The head element 104 may be configured for enclosing the pressure field generator and for permitting comfortable contact with the body of the user. Various connection ports, charging pins, control buttons, and displays may be integrated into the body 102, or to some extent, the head element 104.

Figure 2A:
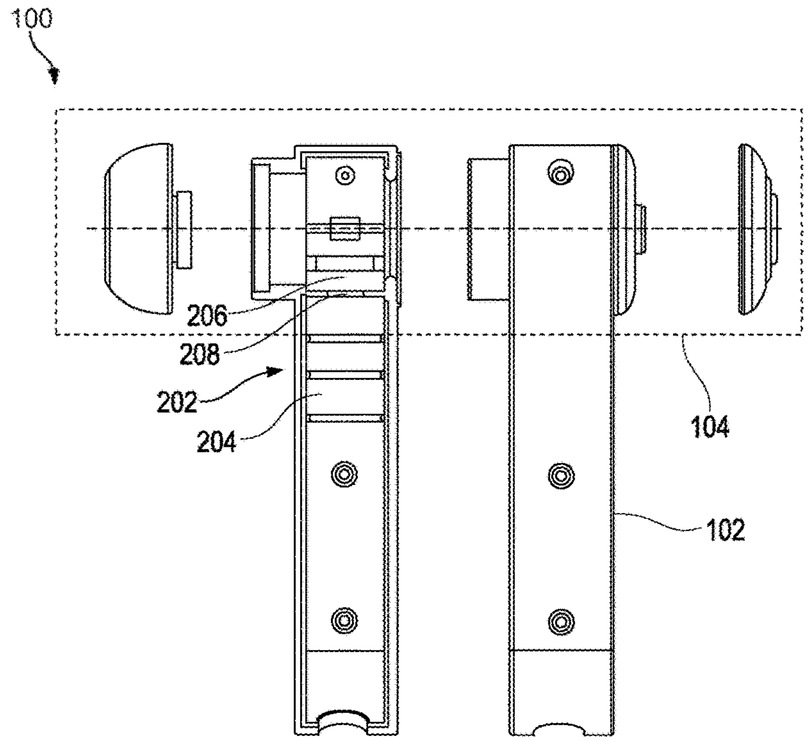
FIG. 2A is an exploded view of a stimulation device from a left-side view.
Figure 2B:
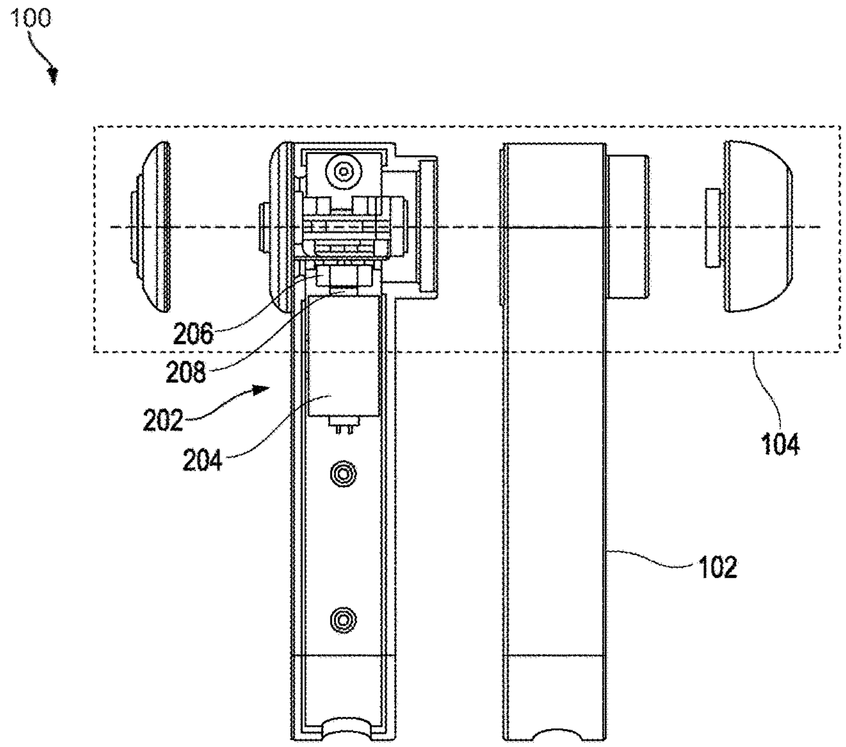
FIG. 2B is an exploded view of the stimulation device of FIG. 2A from a right-side view.

FIG. 2A is an exploded view of the stimulation device 100 from a left-side view and FIG. 2B is an exploded view of the stimulation device 100 from a right-side view. As can be appreciated from these figures, the stimulation device 100 may include the head structure 104 as well as the body 102. Within the head structure 104, a crankshaft 206 is moved by an output shaft 208 of a drive assembly 202, which may include a motor 204. As the output shaft 208 is spun, the crankshaft 206 moves left and right and pulls a tube element along with it, in a reciprocal fashion, to stretch and collapse a flexible wall of a front-facing cavity and thereby generate the interval positive and negative pressure. The drive assembly 202 may be disposed primarily within the body 102 but at least a portion of the motor 204, such as the output shaft 208, may extend into the head structure 104.

Figure 3A:
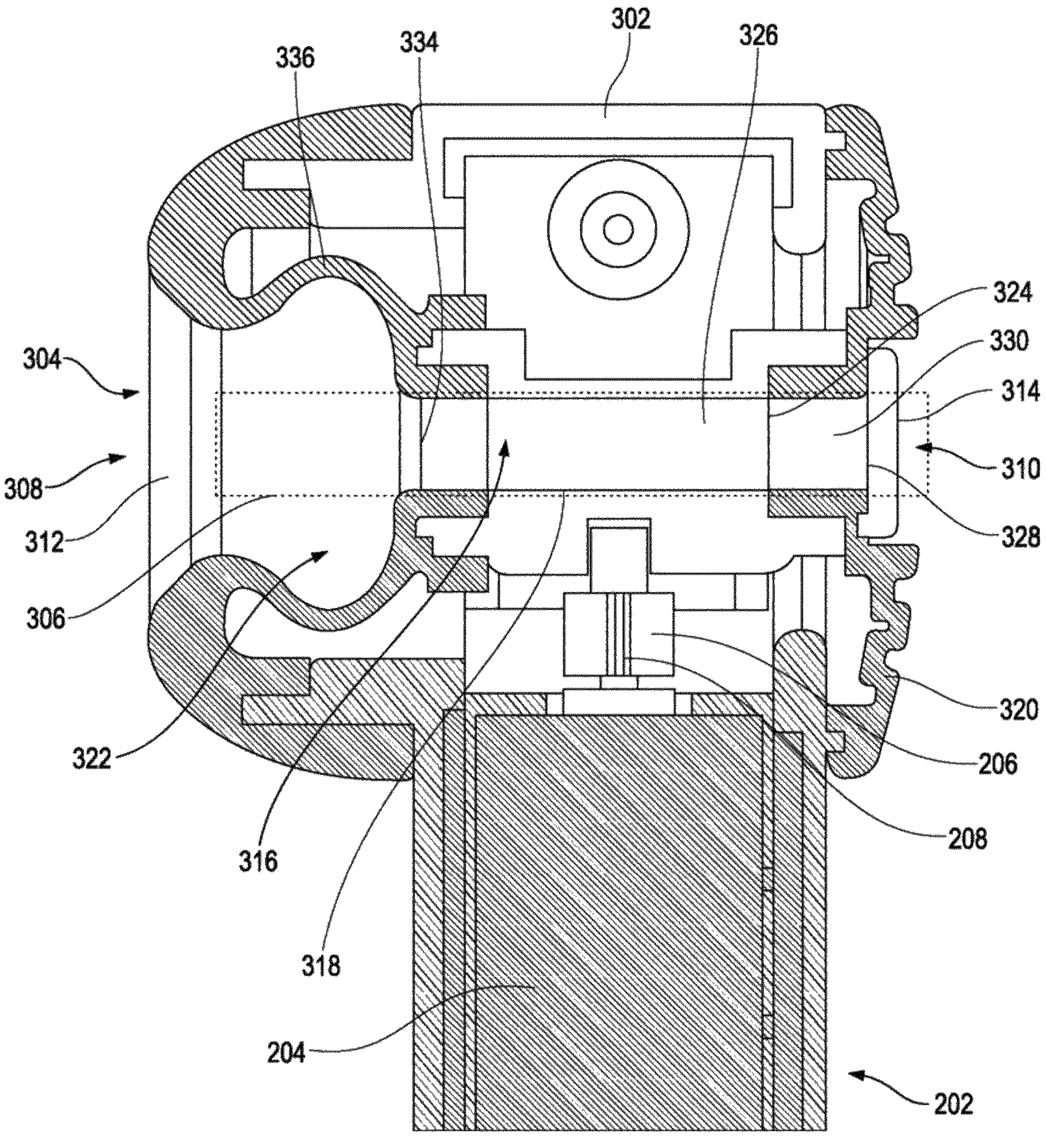
FIG. 3A is a closeup cross-sectional view of the head element and a top portion of the body of the stimulation device in accordance with an exemplary embodiment of the present disclosure.
Figure 3B:
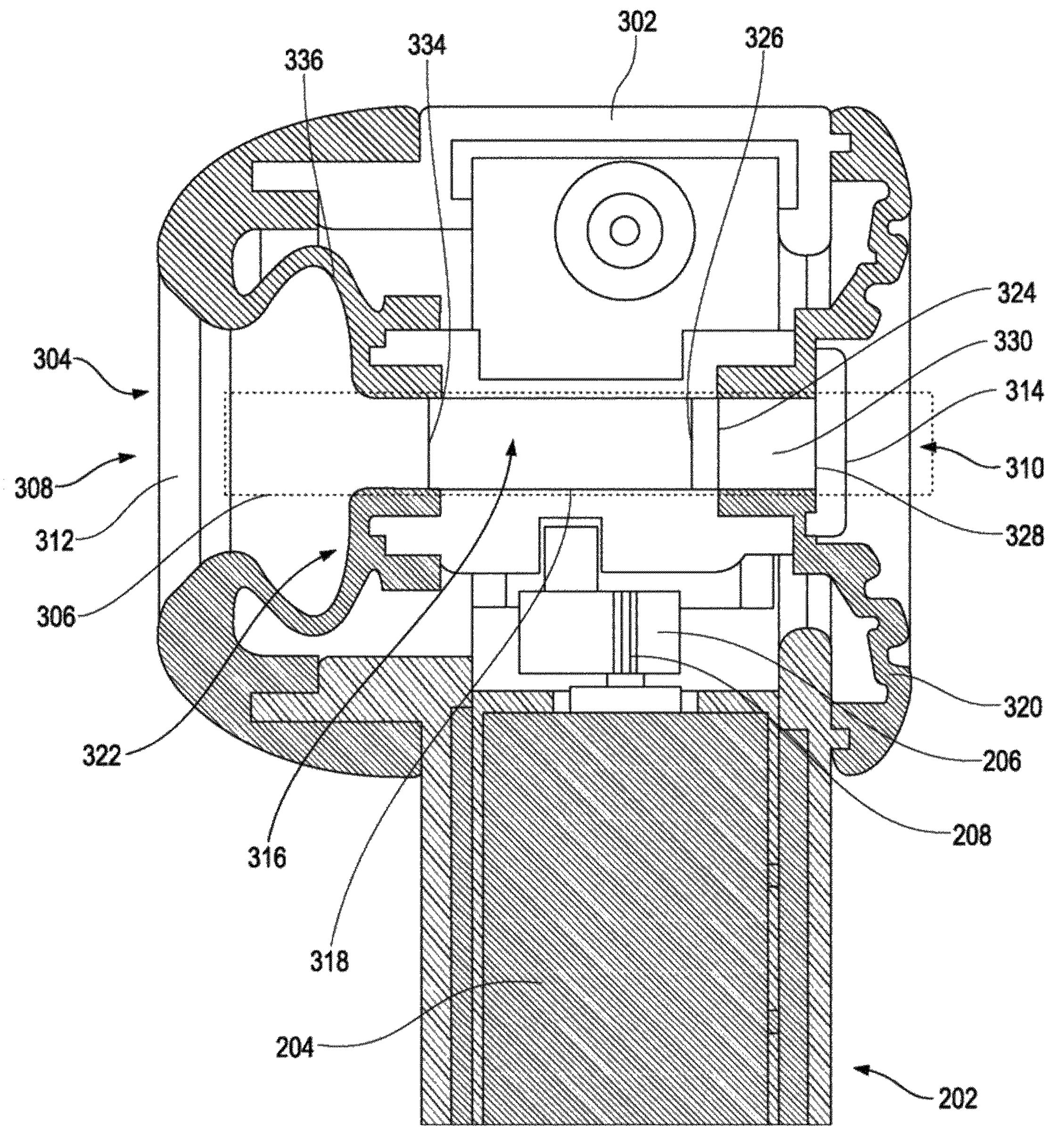
FIG. 3B illustrates the stimulation device in which the cavity has a reduced volume due to the flexile wall being in the lower-volume compressed state.
Figure 3C:
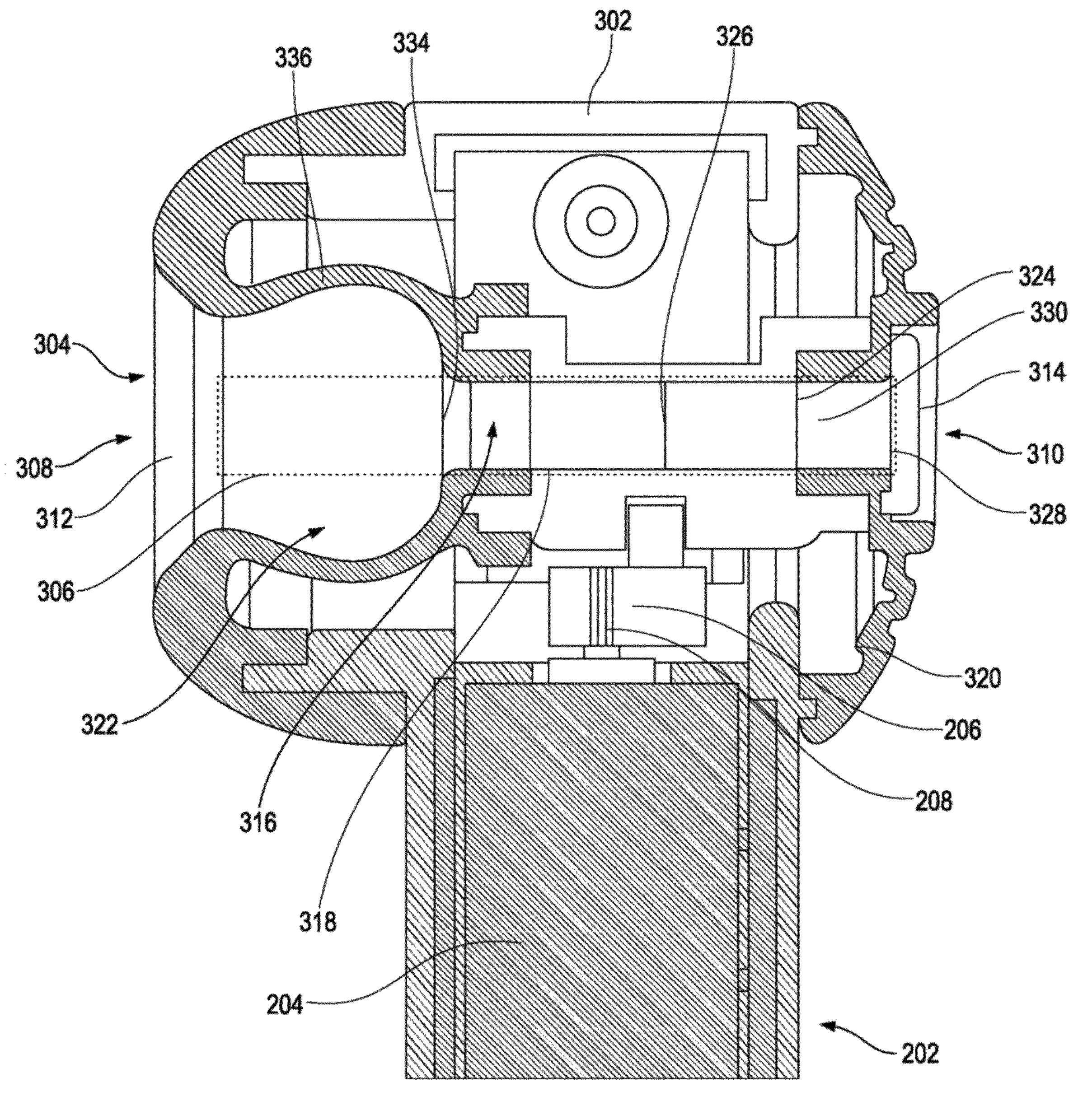
FIG. 3C illustrates the stimulation device in which the cavity has an expanded volume due to the flexile wall being in the higher-volume extended state.

FIG. 3A is a closeup cross-sectional view of the head element 104 and a top portion of the body 102 of the stimulation device 100 in accordance with an exemplary embodiment of the present disclosure. As can be appreciated from this figure, the motor 204 of the drive assembly 202 may spin the output shaft 208 which may turn the crankshaft 206 to move left and right. The crankshaft 206 may in turn move a tube element 318 in the left-and-right directions in a reciprocating fashion. A flexible wall 336 is connected to the tube element 318 in such a way that as the tube element 318 moves left and right in its reciprocating fashion, a flexible portion 334 of the flexible wall 336 also reciprocates thereby causing the flexible wall 336 to change its shape and alternate between a lower-volume compressed state, as is shown in FIG. 3B, and a higher-volume expanded state, as is shown in FIG. 3C.

Thus, as the flexible wall 336 is compressed and expanded, a volume of the cavity 322 defined by the flexible wall 336 shrinks and enlarges causing the internal pressure thereof to increase and decrease to produce the aforementioned positive and negative pressure.

It is noted that the flexible wall 336 that defines the cavity 322 may form a suction nozzle at the first opening thereof that is configured to make contact with an erogenous zone of the user. The suction nozzle may may be configured to pulsate as the pressure field generator generates its positive and negative pressure. The pulsation of the suction nozzle may either be driven independently from the action of the pressure field generator, for example, by the inclusion of a motor disposed therein, or may be linked to the action of the pressure field generator so that no independent motor is needed.

The tube element 318 may form part of a suction channel 326. The suction channel 326 also includes the cavity 322 and air may freely move between the tube element 318 and the cavity 322, through the flexible portion 334, which may be substantially open.

The tube element 318 may be substantially rigid and may include not only the cylindrical part but also a base part therebelow. The base part of the tube element 318 may be configured to engage with the output shaft 208 so that the reciprocal motion of the output shaft in the left-to-right directions can be transferred to the tube element 318 through the base part thereof.

As noted above, the tube element 318 may be a rigid tube. A first end of the rigid tube element 218 is configured to move into and out of the cavity 322 to change the cavity 322 volume, while a second end, opposite to the first end, of the rigid tube element 218 may be at least partially open to the exterior of the sexual stimulation device, allowing air to be expelled through the second end of the rigid tube element 218 during operation.

The first and second ends of the tube element 318 may be aligned along a central axis of the tube element 318. While the first end may include a first opening 312, which may be used for delivering sexual stimulation by the pulsation of positive and negative pressure, the second end of the tube element 318 may accommodate a check valve (1008 in FIGS. 12, 14, 16, and 1008' in FIG. 17). The check valve may therefore be positioned facing away from the first opening.

This configuration may offer a practical benefit when the pressure field generator is used for clitoral stimulation by female users. For example, during sexual arousal, a female user may instinctively press her thighs together. In such cases, placing the check valve at the second end region prevents the valve from being blocked by the user's thighs. This helps maintain the intended airflow and pressure variation within the airflow channel, ensuring the pressure field generator continues to operate effectively.

The suction channel 326 may have the first opening 312 in a first end region 308 on one side of the device and a second opening 324 within a second end region 310, on an opposite side. A one-way valve 314 may be disposed at the second opening 324 to ensure that air can be expelled from the second opening 324 but air cannot be pulled in therefrom. Thus, as the flexible wall 336 alternates between the lower-volume compressed shape and the higher-volume expanded state, air may be forced to enter the suction channel 326 from the first opening 312 so as to create the suction force therefrom. Then, as air is forced out of the suction channel 326, it may exit through the second opening 324 and/or the first opening, to the extent it is not obstructed.

Figure 10A:
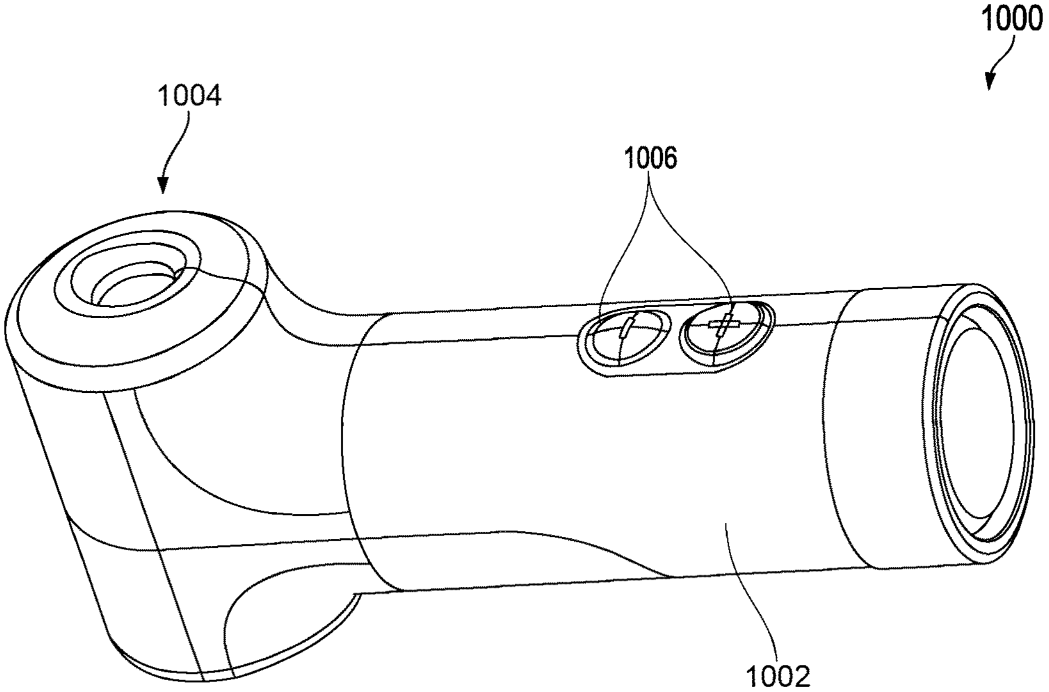
FIGS. 10A, 10B, 10C and 10D are perspective views of a stimulation device in accordance with exemplary embodiments of the present disclosure.
Figure 10B:
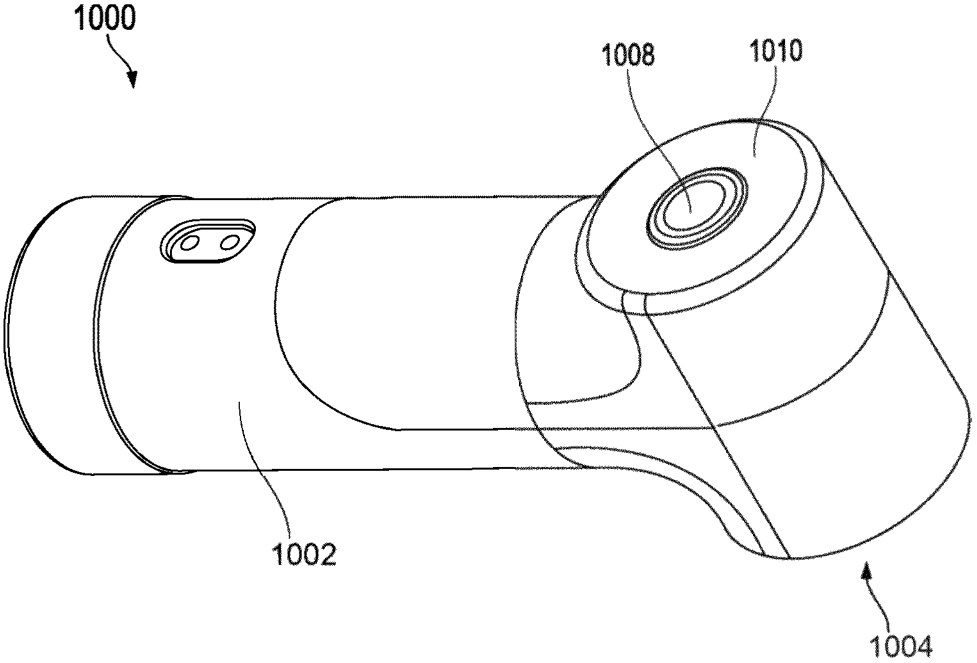
Figure 10C:
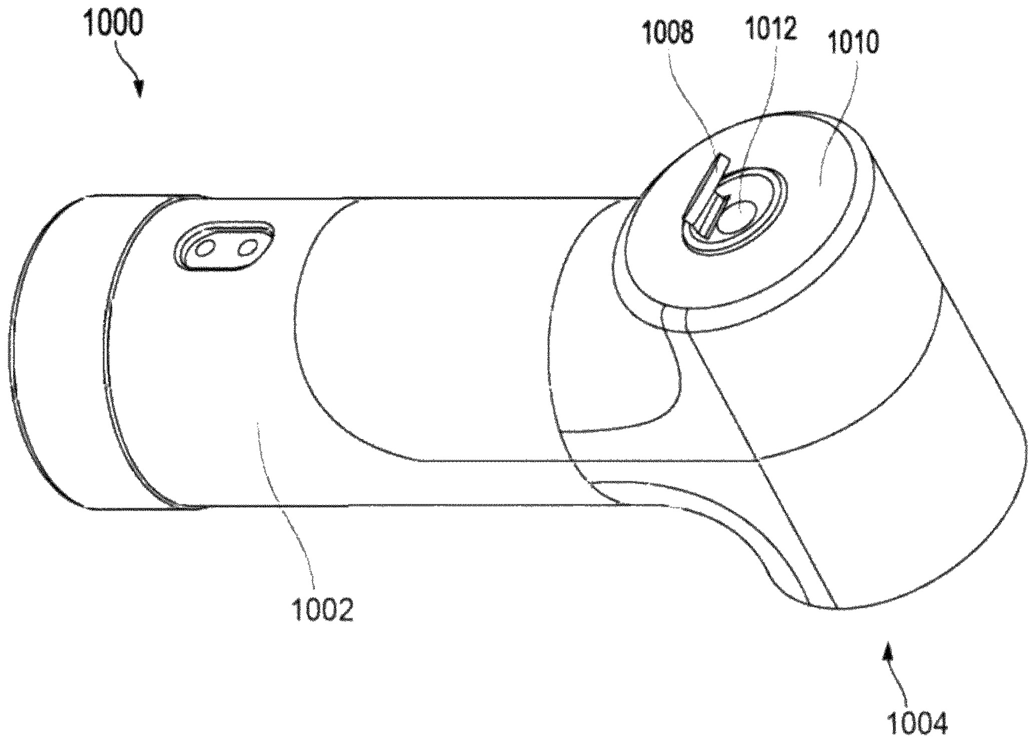

As shown in FIG. 10C, the one-way valve 314 may be removable for effective cleaning.

An airflow channel 306 may be defined within the cavity 322 by the suction channel 326. A portion of the airflow channel 306 within the second end region 310 may be a flexible end cap 330. The flexible end cap 330 may help to fix the suction channel 326 to the structure of the head element 104.

As the second opening 324 may allow air to pass from the suction channel 326 to the valve 314, a third opening 328 may allow air to pass from the valve to the ambient environment.

At the first end region 308, the first opening 312 may allow air into the airflow channel 306 and into the cavity 322. The cavity 322 may have a relatively large open volume so as to pull anatomical tissue of the user therein. The cavity 322 may be part of the airflow channel 306. The cavity 322 may be enclosed by the flexible wall 336 that may also form a continuous uninterrupted structure with an exterior of the first end region 308.

The exterior of the second end region 310 may be defined by a flexible base 320 and the flexible wall 336 may be joined to the flexible base 320 by a top housing panel 302.

The flexible portion 334 may form an interior end wall of the cavity 322 with the flexible portion 334 connecting the top of the flexible wall 336 and establishing an opening through which air can pass.

The suction channel 326, including the cavity 322 and the tube element 318 that is driven by the crankshaft 206 may form the pressure field generator 304. Thus, as the motor 204 operates, the pressure field generator 304 will intermittently suck anatomical tissue of the user into the cavity 322. However, as the suction channel 326 is open at the first end region 308 and the opposing second end region 310, the entire interior thereof may easily be cleaned between uses, by the flushing of water and/or the insertion of a brush, without creating crevices that cannot be cleaned and also without exposing the interior mechanical elements of the stimulation device 100 to the ambient environment.

Even though the tube element 318 may be rigid so that it may be easily moved by the crankshaft 206 and may easily push and pull upon the flexible portion 334, the flexible wall 336 and the flexible portion 334 may be flexible so as to provide the needed distortion without breaking down over time.

It is noted that the flexible wall 336 takes on an amphora shape, with a rounded bottom (to the right of the figure) and a smaller opening at the top (to the left of the figure). As mentioned above, FIG. 3B illustrates the stimulation device 100 in which the cavity has a reduced volume due to the flexile wall 336 being in the lower-volume compressed state and FIG. 3C illustrates the stimulation device 100 in which the cavity 322 has an expanded volume due to the flexile wall 336 being in the higher-volume extended state. As can be appreciated from these figures, the flexible wall 336 can be more greatly curved in the compressed state shown in FIG. 3B and then opens into a more gently curved shape in the expanded state of FIG. 3C.

The amphora shape of the flexible wall 336 and cavity 322 is meaningful as it provides curved soft surfaces in both the compressed and expanded states so as to allow for the sucking in of anatomical tissue of the user into the cavity 322 without risk of irritation or injury as may be caused by sharp folds and hard surfaces. This shape also allows for the easy cleaning of the cavity by the introduction of water, which may easily flow though the surfaces without turbulence.

It is also noted that a central axis of the cavity 322 is aligned with or is identical to a central axis of the tube element 318, which permits the flexible wall 336 to expand and contract in a predictable and symmetric fashion that spreads stresses evenly across its structure so as to reduce wear and the possibility of tearing with extended use. This structure also allows the tube element 318 to serve the dual roles of manipulating the volume of the cavity 322 volume and also allowing air to pass out of the cavity 322 therethrough, although embodiments of the present disclosure may alternatively provide these two features using two separate elements, one element connected to the crankshaft 206 to manipulate the volume of the cavity 322 and a separate flexible tube to carry airflow.

Alternatively, the cavity 322 need not be coaxial with the tube element 318 and the tube element 318 may meet the cavity 322 at an angle or a curve. According to embodiments of the present disclosure, the tube element 318 may meet the cavity 322 to form a horn shape in cross-sectional view.

It is noted that the reciprocating motion that drives the flexible wall 336 is not necessarily limited to the motor and crankshaft arrangement discussed above and other means of providing the reciprocating driving may be used. For example, a magnetic arrangement may be used to drive the tube element 318.

Figure 4:
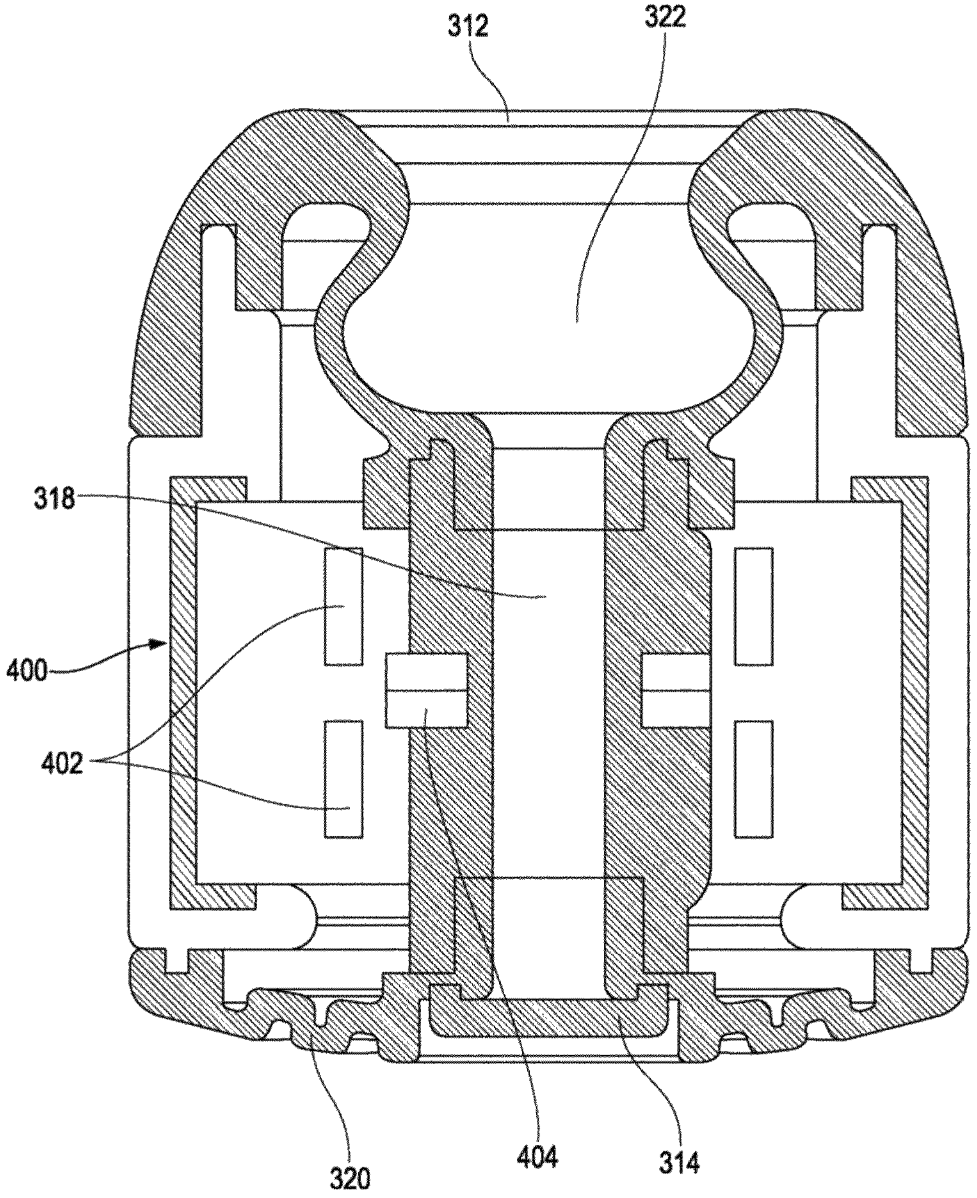
FIG. 4 is a cutaway view of the head element of a stimulation device that uses a magnetic drive, in accordance with exemplary embodiments of the present disclosure.

FIG. 4 is a cutaway view of the head element 104 of a stimulation device that uses a magnetic drive, in accordance with exemplary embodiments of the present disclosure. As can be seen from this figure, the cavity 322 is manipulated by the reciprocal motion of the tube element 318 but here a magnetic ring 404, which may be a permanent magnet in the shape of a ring that encircles the tube element 318, is drawn up and down, in a reciprocal fashion, by the activation and deactivation of a pair of electromagnetic coils 402 that encircle the tube element 318 and the magnetic ring 404. The selective activation of the electromagnetic coils 402 may be controlled by a controller circuit so as to use attractive and/or repulsive magnetic forces to move the magnetic ring 404 up and down and this in turn drives the tube element 318 in its reciprocal motion so as to manipulate the volume of the cavity 322 and create the desired suction.

The electromagnetic coils 402 together with the magnetic ring 404 may form a magnetic drive 400. While there magnetic drive 400 may operate in one of several different configurations, according to one example, the magnetic ring 404 may be a permanent magnet with its north or south pole facing up on the figure and the electromagnetic coils 402 are either selectively energized or one is energized with an opposite direction of current flow as the other and then the currents are switched periodically to reverse the magnetic polls thereby driving the magnetic ring 404 by either attraction or repulsion alone or by attraction and repulsion at the same time.

In this embodiment, the body 102 may connect to any desired side of the stimulation device 100 head unit 104 such as the left, right, or even the bottom if connected so as not to obstruct the airflow. Alternatively, a grip may be fashioned around the head unit 104 so that no body 102 is needed.

It is noted that the magnetic ring 404 need not have north/south pointing up/down (with reference to the directionality of FIG. 4) but alternatively the magnetic ring 404 can be formed of a two-part ring (as shown) with a top ring being north/south facing inwardly and south/north facing outwardly and a bottom ring being the reverse polarity. In either case, the manner in which the electromagnetic coils 402 are wrapped so as to interact with the magnetic poles of the magnetic ring 404 to bring about the aforementioned reciprocation of the tube element 318.

Figure 5:
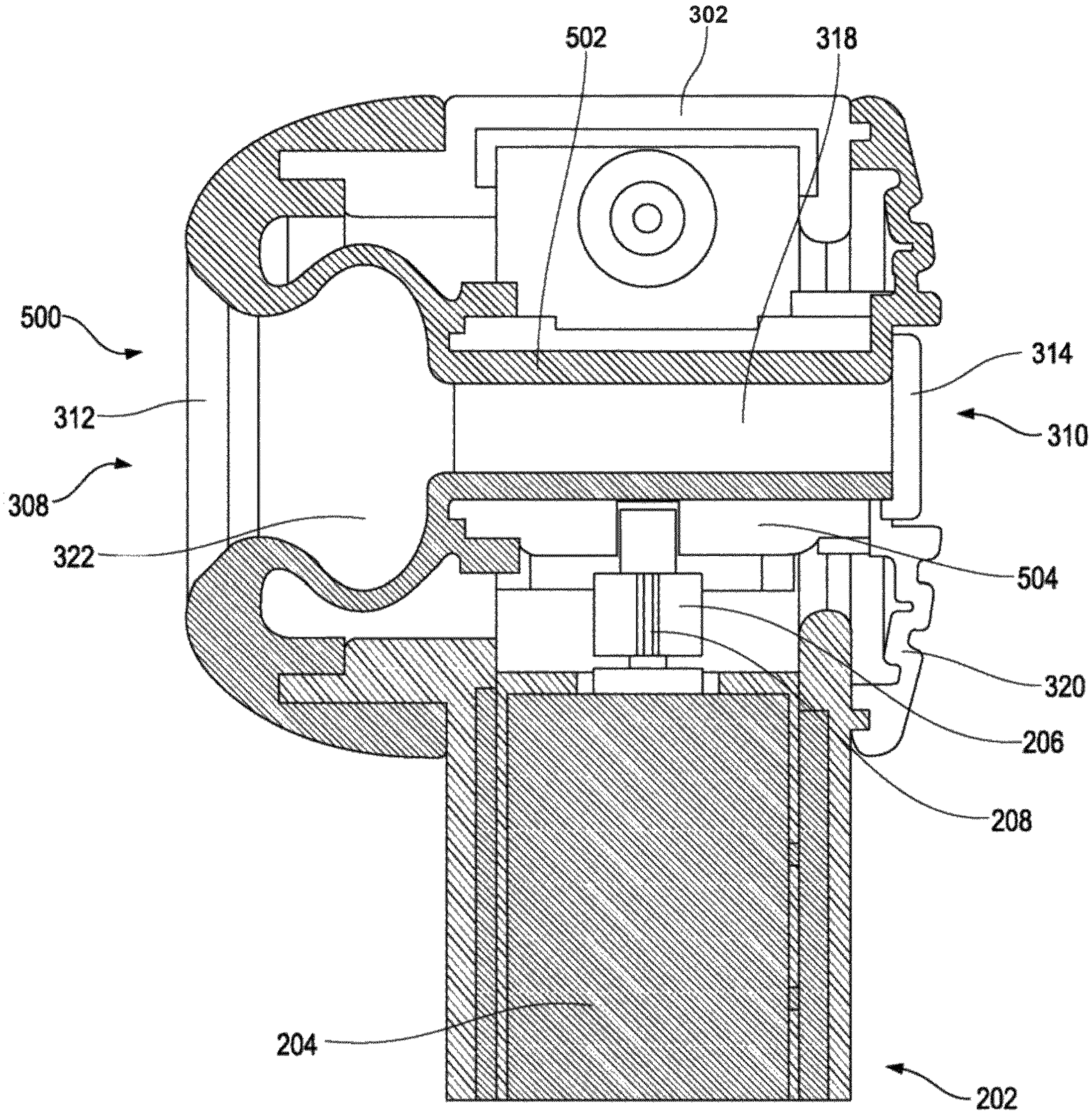
FIG. 5 is a closeup cross-sectional view of the head element and a top portion of the body of the stimulation device in accordance with an exemplary embodiment of the present disclosure.

FIG. 5 is a closeup cross-sectional view of the head element 104 and a top portion of the body 102 of the stimulation device 100 in accordance with an exemplary embodiment of the present disclosure. According to this arrangement, a modified pressure field generator 500 includes a flexible wall 336 of the cavity 322 that continues uninterrupted to form a flexible lining 502 within a rigid cylindrical channel 504, which along with the flexible lining 502, defines the tube element 318. The rigid cylindrical channel 504 also includes the aforementioned base part of the tube element 318 that interfaces with the crankshaft 206.

Figure 6:
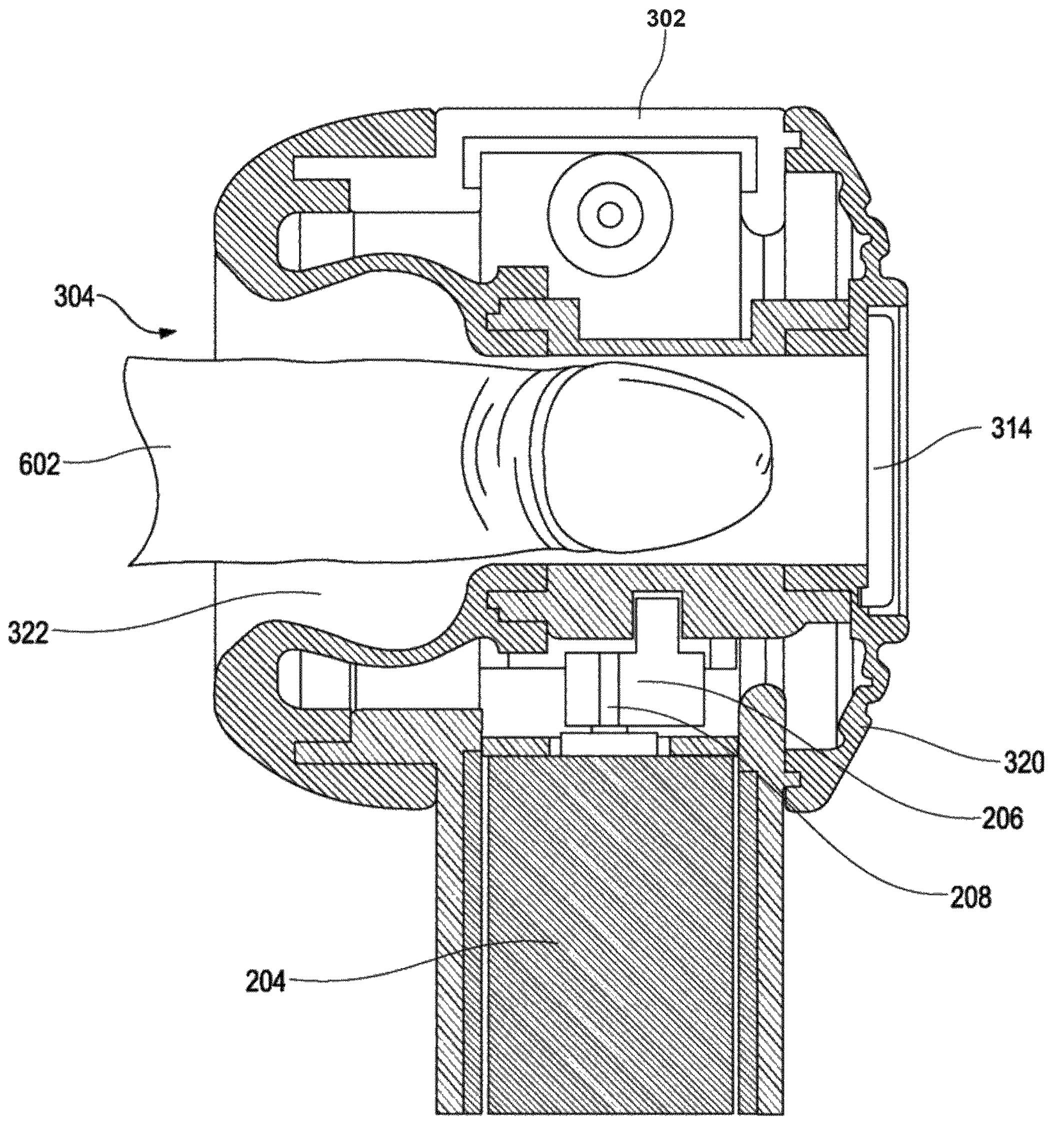
FIG. 6 is a cross-sectional view of the head element and a top portion of the body of the stimulation device with the insertion of sensitive erogenous tissue of the user therein.

By providing this modified pressure field generator 500 with the flexible lining 502 that continues from the flexible wall 336, a soft and protective area is formed, not only within the cavity 322 but also within the tube element 318 so that to the extent that sensitive erogenous tissue of the user is pulled into or inserted into the cavity 322 and into the tube element 318 as well, this sensitive erogenous tissue (such as a penis 602 or clitoris) may be protected from harm while also creating a space that may be easily cleaned. FIG. 6 is a cross-sectional view of the head element 104 and a top portion of the body 102 of the stimulation device 100 with the insertion of sensitive erogenous tissue of the user therein.

As can be appreciated from this figure, not only is the flexible lining 502 of the tube element 318 configured to provide a protective area for contacting the sensitive erogenous tissue of the user, but the reciprocal motion of this section may further be configured to provide sexual stimulation by the reciprocation of the flexible lining 502 which may rub against the sensitive erogenous tissue of the user even as the negative pressure is periodically applied, thereby providing two simultaneous stimulation modalities.

Figure 7:
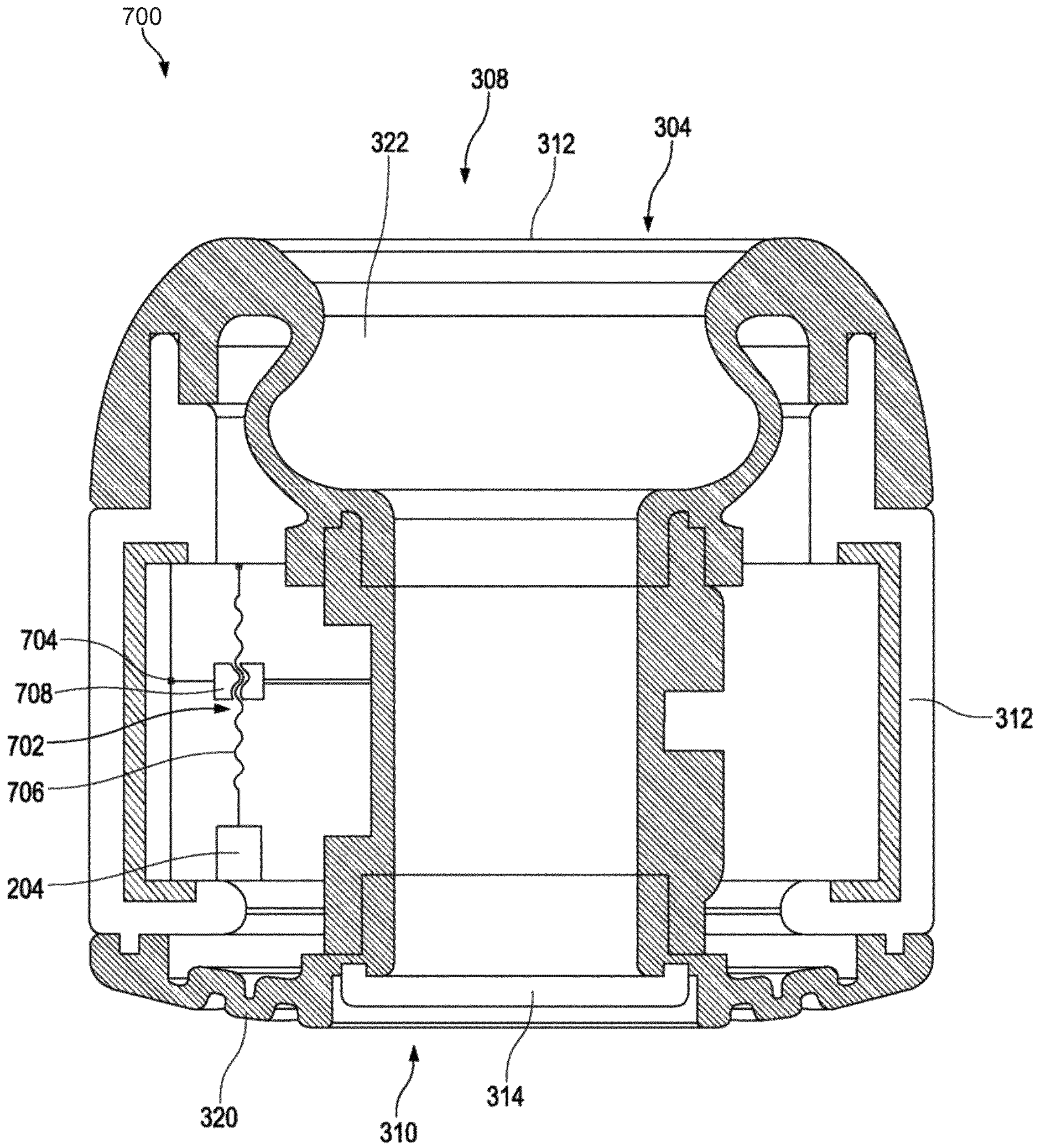
FIG. 7 is a cutaway view of the head element of a stimulation device that uses a magnetic drive, in accordance with exemplary embodiments of the present disclosure.

FIG. 7 is a cutaway view of the head element 104 of a stimulation device that uses a magnetic drive, in accordance with exemplary embodiments of the present disclosure. Unlike the arrangement depicted in FIGS. 3A-3C in which the reciprocating motion is generated by a spinning of a motor shaft, or the arrangement depicted in FIG. 4 in which the reciprocating motion is generated by magnetic attraction, in the arrangement depicted in FIG. 7, the sexual stimulation device 700 operates under the driving of a motor 204 which spins a screw 706. As the screw spins 706, a nut 708 that is mated to the tube element 318 is forced up and down as its threaded interior surface allows the screw 706 to spin within it and drive it in a reciprocating manner. In this way, as the nut 708 is driven up and down, the tube element 318 is also forced up and down in this reciprocating manner.

Together, the nut 708 and screw 706 form an engaged pair 702 that is responsible for producing reciprocating motion from the spinning of the motor 204.

There are various different ways in which the spinning of the motor 204 can be set up to move the nut 708 in both the up and down directions. According to one approach, the motor 204 can be configured to periodically change direction by the alteration of its electrical driving signal. Alternatively, the screw may have a dual-helical groove in its outer surface that may include an ascending helical groove and a descending helical groove (i.e., levorotatory helical groove and a dextrorotatory helical groove). The two helical grooves may be interlaced with one another and are connected end-to-end at both the top and bottom of the screw so that as the screw 706 rotates within the threaded nut 708, the nut 708 is pulled all the way to one end and then automatically reverses its motion as the threads of the nut 708 leave one helical groove and move to the next, as is described and illustrated in U.S. Pat. No. 12,178,774, which is incorporated by reference herein in its entirety.

A guiderail 704 may be disposed in a stationary position and a pole with a loop threaded about the guiderail 704 may be used to stabilize the motion of the nut 708 across its full range of travel so as to minimize lateral sway.

Figure 8A:
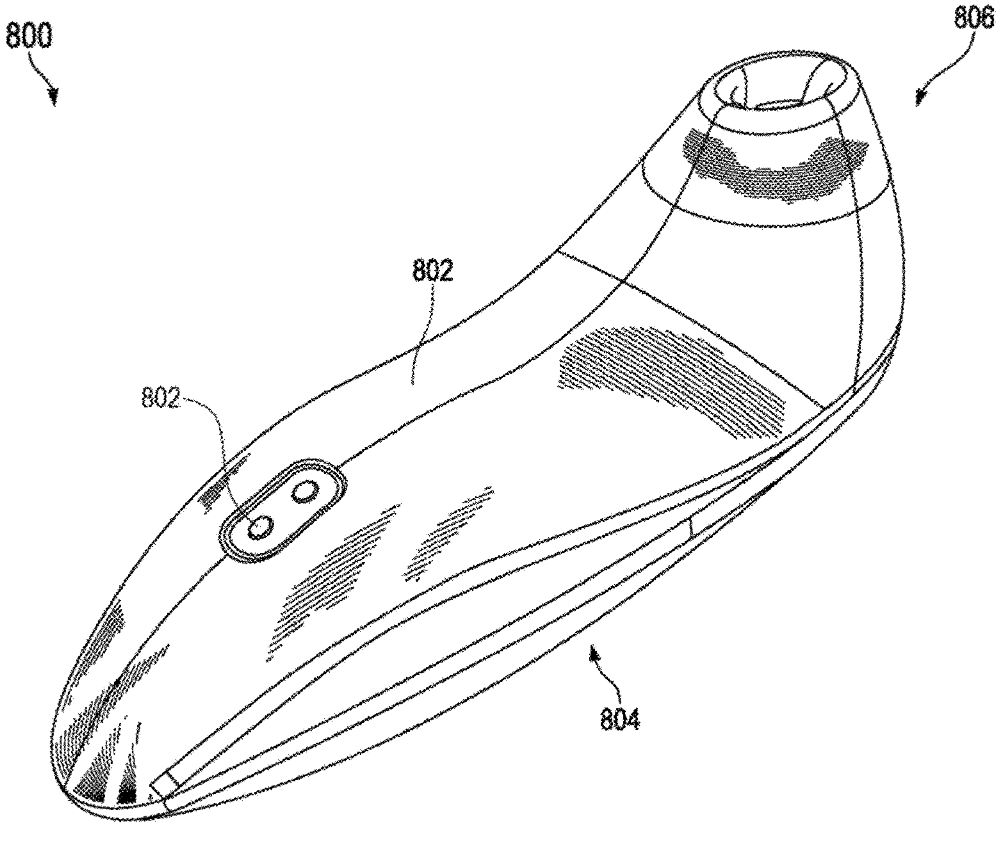
FIGS. 8A and 8B are perspective views of a sexual stimulation device, in accordance with embodiments of the present disclosure.
Figure 8B:
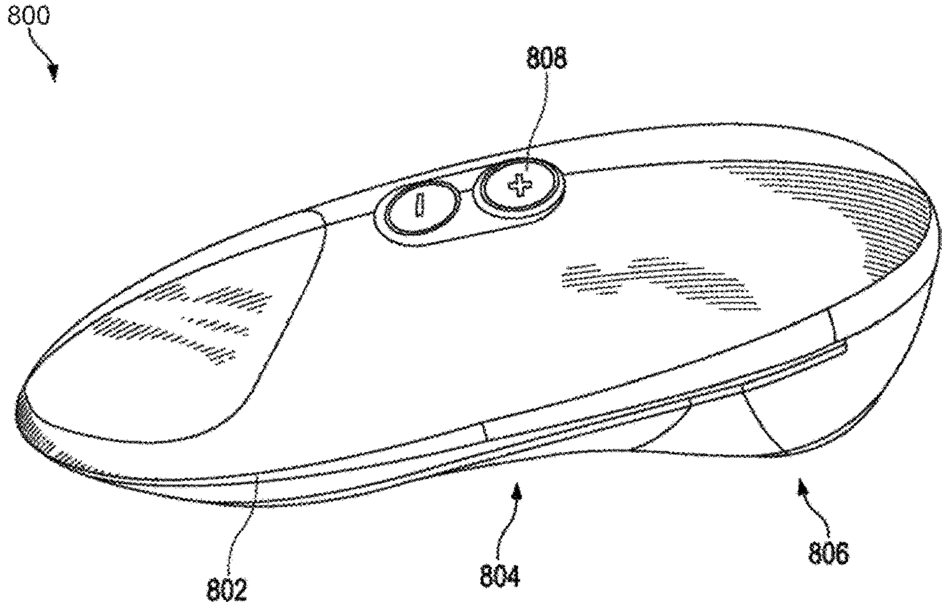
Figure 9A:
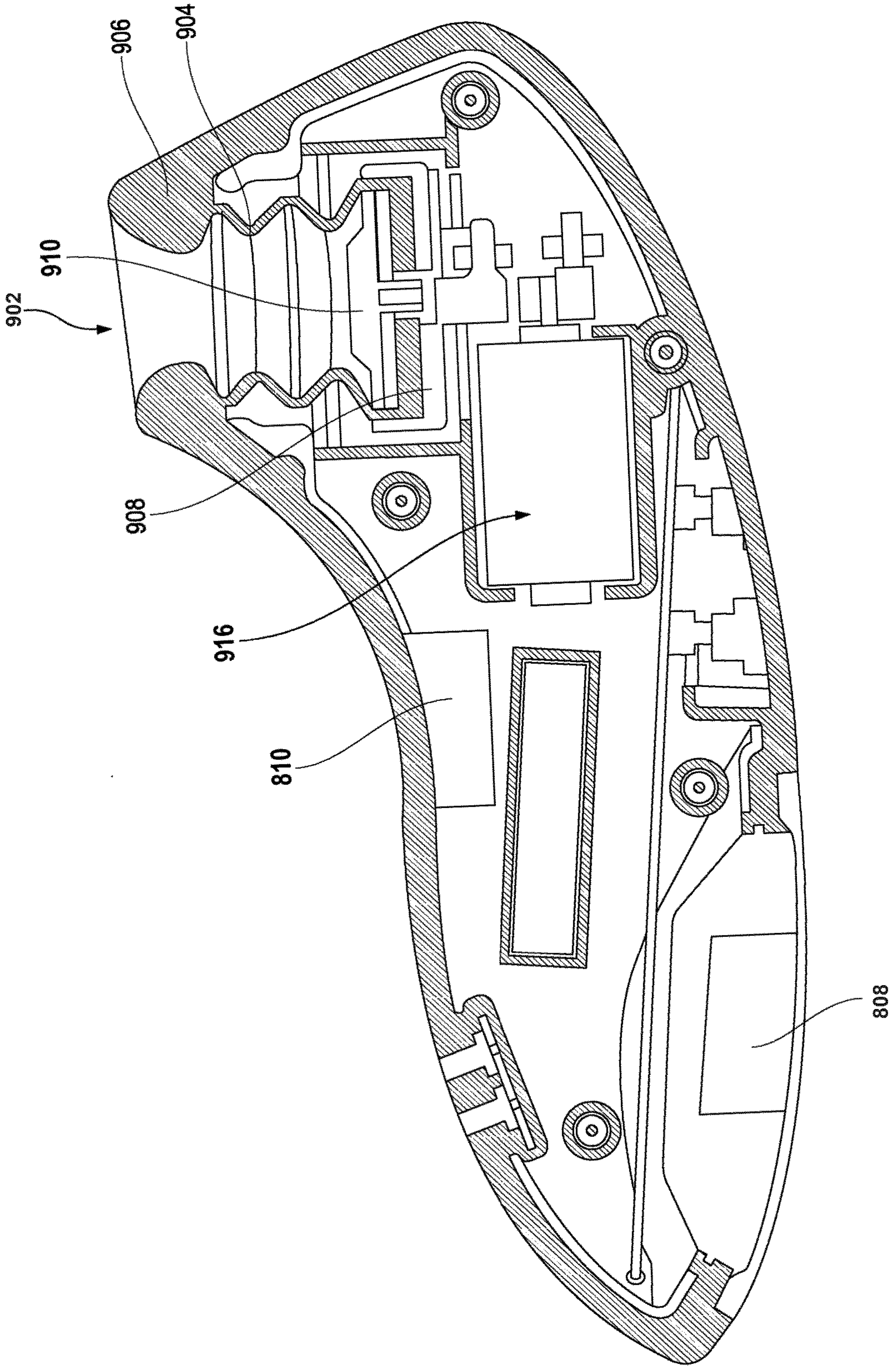
FIGS. 9A and 9B are cross-sectional cutaway views of the sexual stimulation device 800 of FIGS. 8A and 8B.
Figure 9B:
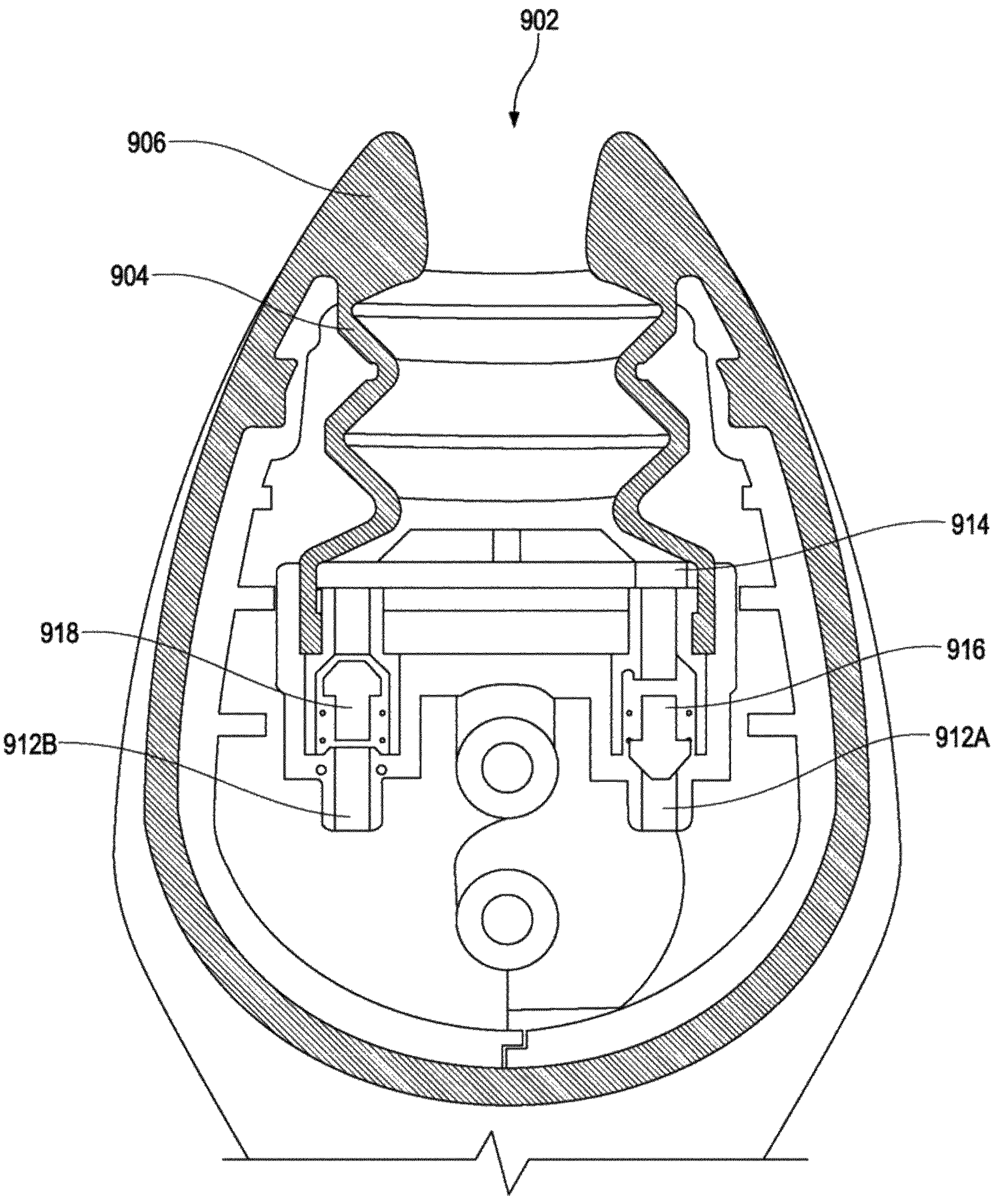

FIGS. 8A and 8B are perspective views of a sexual stimulation device 800, in accordance with embodiments of the present disclosure. FIGS. 9A and 9B are cross-sectional cutaway views of the sexual stimulation device 800 of FIGS. 8A and 8B.

As can be appreciated from FIGS. 8A and 8B, the sexual stimulation device 800 includes a housing 802 that covers a body unit 804 and a head unit 806. The housing may provide an encasement for the device 800 upon which charging pins 810, ports, and buttons 808 may be disposed.

The head unit 806 may be made of resilient and flexible material. In a non-limiting example, the head unit 806 may be made of flexible material, such as but not limited to silicone, borosilicate glass, thermoplastic elastomer (TPE) or thermoplastic rubber (TPR), Lucite, and the like. Further, the body unit 804 may be made of stainless steel, acrylonitrile butadiene styrene (ABS) plastic, and the like.

In the depicted example, the body unit 804 and the head unit 806 integrally form a uniform structure of the sexual stimulation device 800. However, the present disclosure is not necessarily limited to the design of the unitary structure, other structures of the sexual stimulation device are also possible.

As can be seen from FIG. 9A, the head unit 806 includes a pressure filed generator 902 at an opening thereof. The pressure field generator includes a flexible skin 906 that wraps around the exterior of the unit and continues on inside the opening of the pressure filed generator 902 so as to form as an integral unit with flexible bellows 904. Rather than the cavity 322 being defined by a flexible wall 336, here the bellows 904 define the cavity and the cavity is capped by a plug 910 that is held in place by a back plate 908 that reciprocates.

As the back plate 908 reciprocates, the plug 910 forces the bellows 904 into contraction and expansion thereby changing the volume of the cavity to generate the desisted pressure changes.

The plug 910 may regulate the pressure within the cavity by the incorporation of a valve that is able to vent air therefrom. However, alternatively, the plug 910 may create an airtight seal within the cavity.

A motor 916 may provide the turning force which may be transformed into the desired reciprocating motion. FIG. 9B is a cutaway view of the head unit 806 described above. As can be appreciated from this vantage, which is a rotation of the image of FIG. 9A. Thus, the pressure filed generator 902 is seen from its top-down.

According to this illustration, the plug 910 and/or the back plate 908 may include air holes 914 for venting air during the contraction of the bellows 904 and for taking in air during the expansion of the bellows 904. This arrangement may be used to limit the amount of suction and blowing that the stimulation device is capable of delivering so as to provide a safe use experience.

The airholes may be a pair of airholes with one leading into a first check valve 912A and the other leading into a second check valve 912B. These two check valves may each allow for the one-way flow of air in and out of the cavity and may be used to establish two opposite pathways for the flow of air 918 and 919 that are depicted in the drawing by arrows. As each check valve 912A and 912B may be independently controlled, for example, to be fully opened, fully closed, or to be in some intermediate position, the amount of suction and blowing of the stimulation device may be precisely controlled. An arrangement of tubes and openings be used to allow for air to enter and exit from the device by the check valves 912A and 912B or alternatively, the check valves 912A and 912B may be directly exposed to the exterior of the device, as is seen in FIGS. 10A-10D.

FIGS. 10A, 10B, 10C, and 10D are perspective views of a stimulation device in accordance with exemplary embodiments of the present disclosure. As can be seen from these figures, the stimulation device 1000 provides for a substantially cylindrical base 1002 and a substantially cylindrical head 1004 that are perpendicularly arranged with respect to one another. A set of control buttons 1006 may be seen on one side of the device while a set of charging pins may be seen on the revise side of the device. As can be seen from this arrangement, the check valves 1008 may be disposed directly on the cylindrical head 1004, opposite to the pressure field generator opening. A flexible base part 1010 of the cylindrical head 1004 may encircle the check valves 1008.

The sexual stimulation device 1000 may include a body 1002, and a head 1004 positioned at an end portion of the body 1002. The sexual stimulation device may further include a pressure generator (not visible in FIGS. 10A, 10B, and 10C) disposed within the head 1004. A change in volume within a cavity of the pressure generator can create alternating negative pressure stimulation, relative to the reference pressure, to the erogenous zone. This effect may be due to the one-way flow facilitated by a check valve 1008 located within the head 1004. The check valve 1008 can be adapted to be operated in a closed state (shown in FIG. 10B) and in the open state (shown in FIG. 10C). The check valve 1008 operated in the closed state prevents the reverse flow of fluid. The check valve 1008 in the closed state may maintain or build pressure, contributing to the desired suction or negative pressure effect. The check valve 1008 can be operated in the open state allows the flow of fluid to pass freely through the sexual stimulation device 1000. Further, the check valve 1008 operated in the open state allows for the release or regulation of pressure, contributing to the desired effect of creating alternating negative pressure stimulation. As can be seen from FIG. 10C, behind the check valves 1008 may be an air pathway 1012, which will be described in greater detail with respect to FIGS. 11 and 12.

Figure 10D:
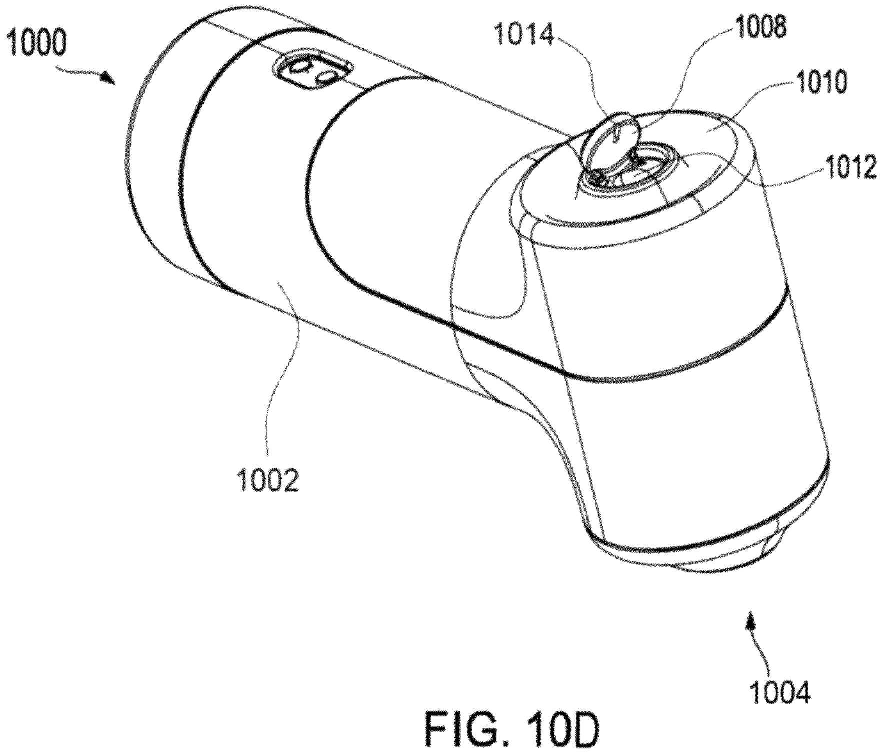

FIG. 10D is a perspective view of a stimulation device in accordance with exemplary embodiments of the present disclosure. In FIG. 10D, it can be appreciated that the check valve 1008 is in an open state. The check valve may comprise a notch 1014 through which fluid flows from within the airflow channel to the exterior of the sexual stimulation device.

Figure 11:
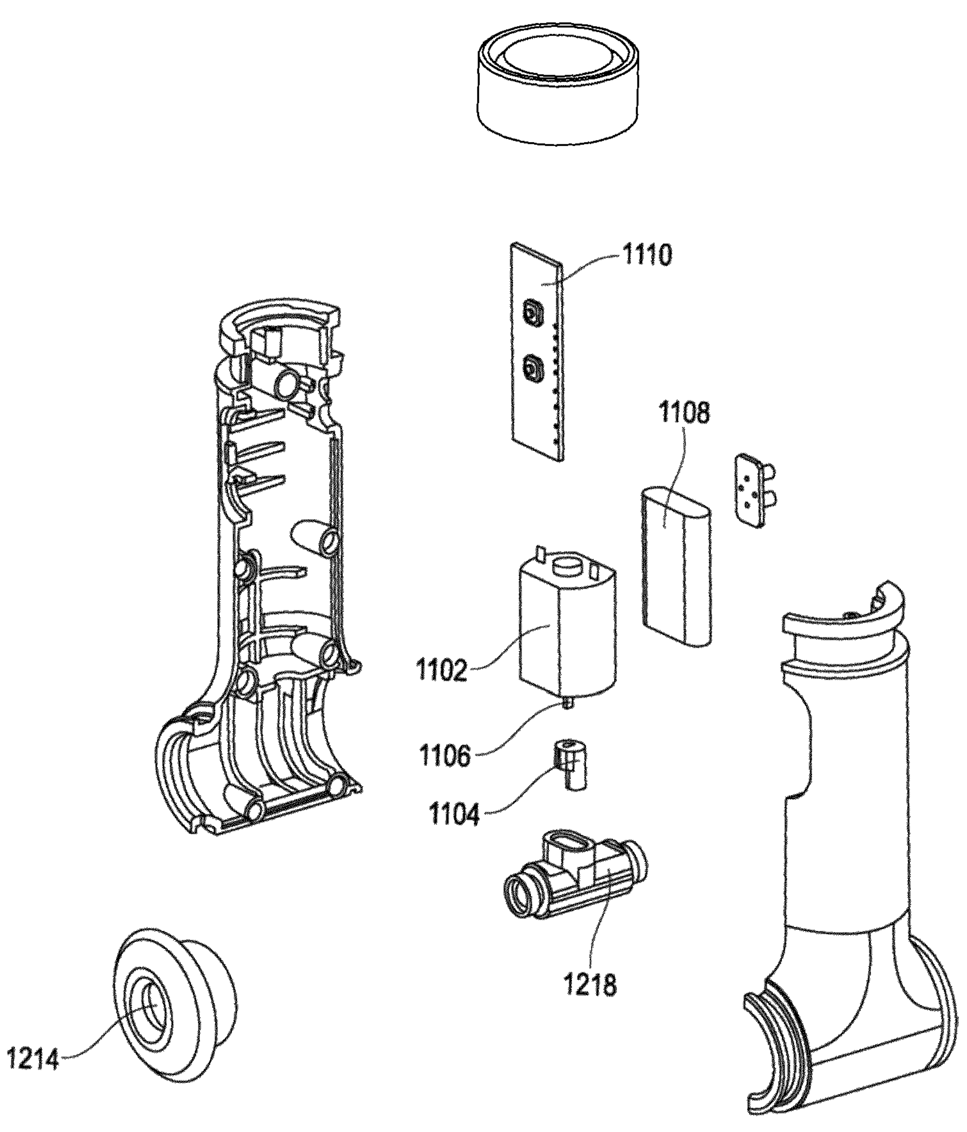
FIG. 11 is an exploded view and FIG. 12 a cross-sectional cutaway view of the stimulation device of FIGS. 10A-10C.
Figure 12:
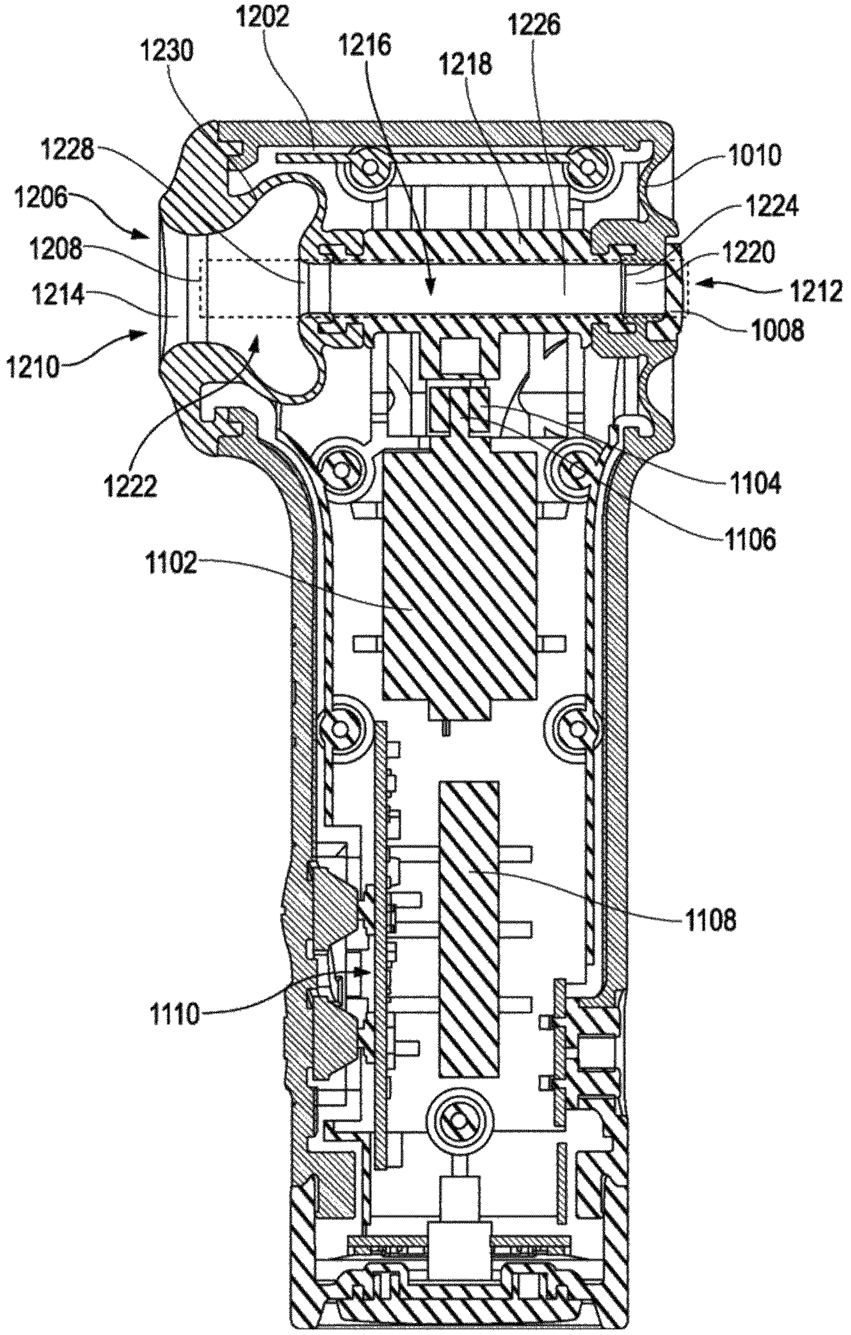

FIG. 11 is an exploded view and FIG. 12 a cross-sectional cutaway view of the stimulation device of FIGS. 10A-10C. As can be appreciated from FIG. 11, the base 1002 may be comprised of two casing elements that snap together and may be held in place, at least in part, by a securing ring. Within the two casing elements of the base 1002 are enclosed a controller circuit 1110, a battery 1108, a motor 1102, a motor shaft 1106, a crankshaft 1104, a tube element 1218, and an opening cap 1214.

An arrangement for these parts may be appreciated from the cutaway view of FIG. 12. Here, the battery 1108 may send power to the controller circuit 1110 which may use the power of the battery 1108 to activate the motor 1102 which may spin the motor shaft 1106 to drive the crankshaft 1104, which may in turn be responsible for pulling the tube element 1218 in a reciprocating motion (left-and-right as shown). The tube element 1218 may be part of the suction channel 1226 which may be considered a suction part 1216 of the pressure field generator 1206.

The tube element 1218 may push and pull on a flexible portion 1228, which may be configured to allow an open connection between the flexible wall 1230 that defines the cavity 1222 and the tube element 1218. Thus, as the tube element 1218 moves in its reciprocal manner, the flexible wall 1230 contracts and expands to thereby alter the volume of the cavity 1222 and generate the desired pressure field.

The flexible wall 1230 may wrap around an exterior of the front of the device to define a first opening 1214 at the first end region 1210 of the pressure field generator 1206 and the airflow channel 1208.

At the opposite side of the pressure field generator 1206 and the airflow channel 1208 is a second end region 1212 having a second opening 1224. A flexible base part 1220 may include a third opening which may complete the airflow channel 1208.

As can be appreciated from this figure, the housing 1202 may enclose the device and the tube element 1218 may be given slack to move in its reciprocating fashion by a flexible base part 1010 which may have a concave shape and may be made of a flexible material so that the tube element 1218 may move unimpeded.

In the depicted configuration, the check valve 1008 (shown in FIG. 12) can serve, not only as an element that regulates the flow of air out from the exterior of the sexual stimulation device, but may also serve as a stimulation point of the stimulation tip, causing a pulsating action in an isolation manner when the tube element 1218 moves in the reciprocating motion. This isolated pulsating action can occur due to the specific interaction of the check valve 1008 with the tube element 1218. For example, the stimulation point can be configured to oscillate, pump, thrust, and/or pulsate, enabling it to move inward and outward (i.e., up-and-down motion) relative to the flexible base part 1010. This movement can be achieved through the precise configuration of the stimulation point, which may allow it to generate inward and outward movement, either pushing or pulling in response to specific forces or mechanical inputs provided by the drive member 1102. The flexible base part 1010 can provide the necessary support and flexibility to the tube element 1218, allowing for controlled, dynamic movement along the designated path.

Figure 13:
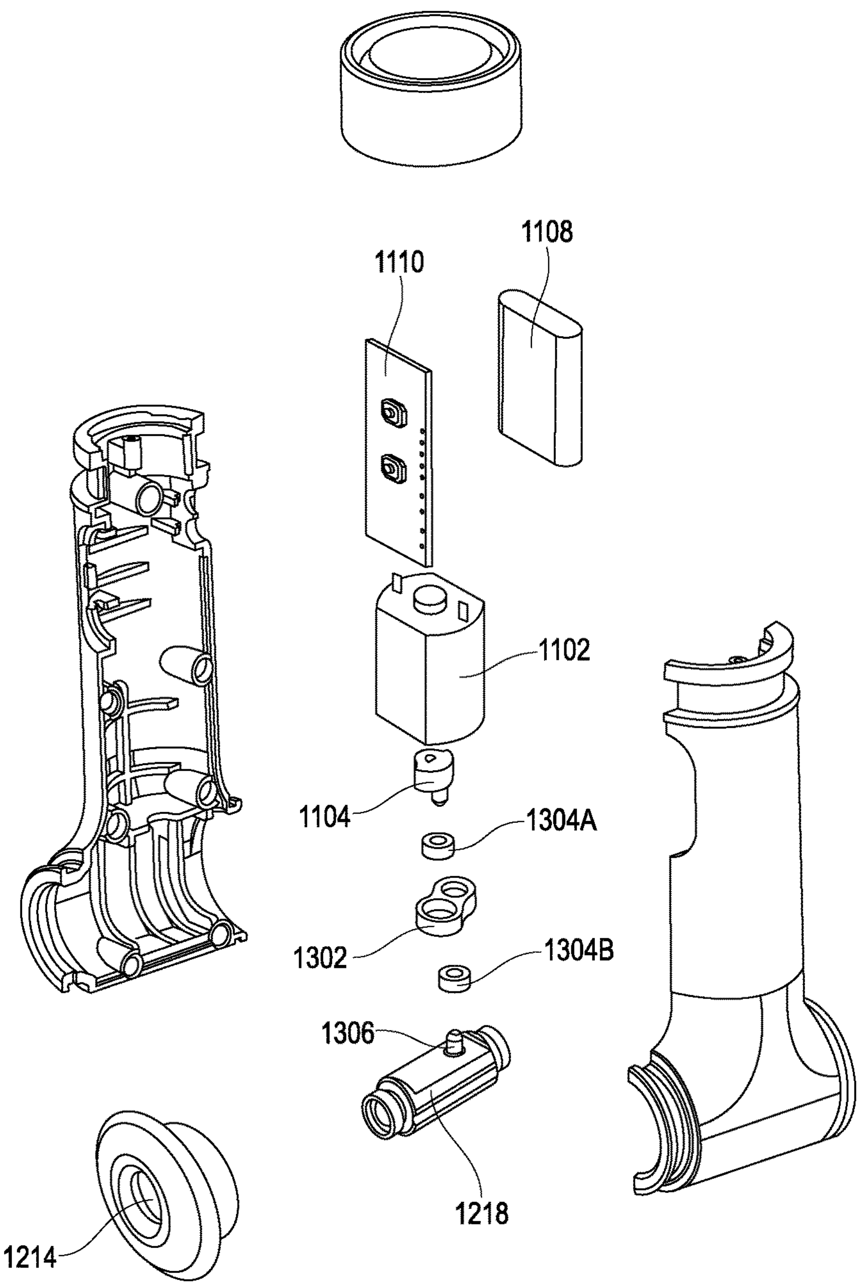
FIG. 13 is an exploded view of a sexual stimulation device in accordance with exemplary embodiments of the present disclosure.

FIG. 13 is an exploded view of a sexual stimulation device in accordance with exemplary embodiments of the present disclosure. As may be appreciated from this figure, as the crankshaft rotates, it may pull a first bearing 1304A which may be linked to a second bearing 1304B by a connecting rod 1302. The second bearing 1304B may then be linked to a mount 1306 of the tube element 1218 and in this way, the reciprocating motion of the tube element 1218 may be driven by the turning of the motor 1102. The first and second bearings 1304A/B may be instantiated as journal bearings, ball bearings, roller bearings, etc.

Figure 14:
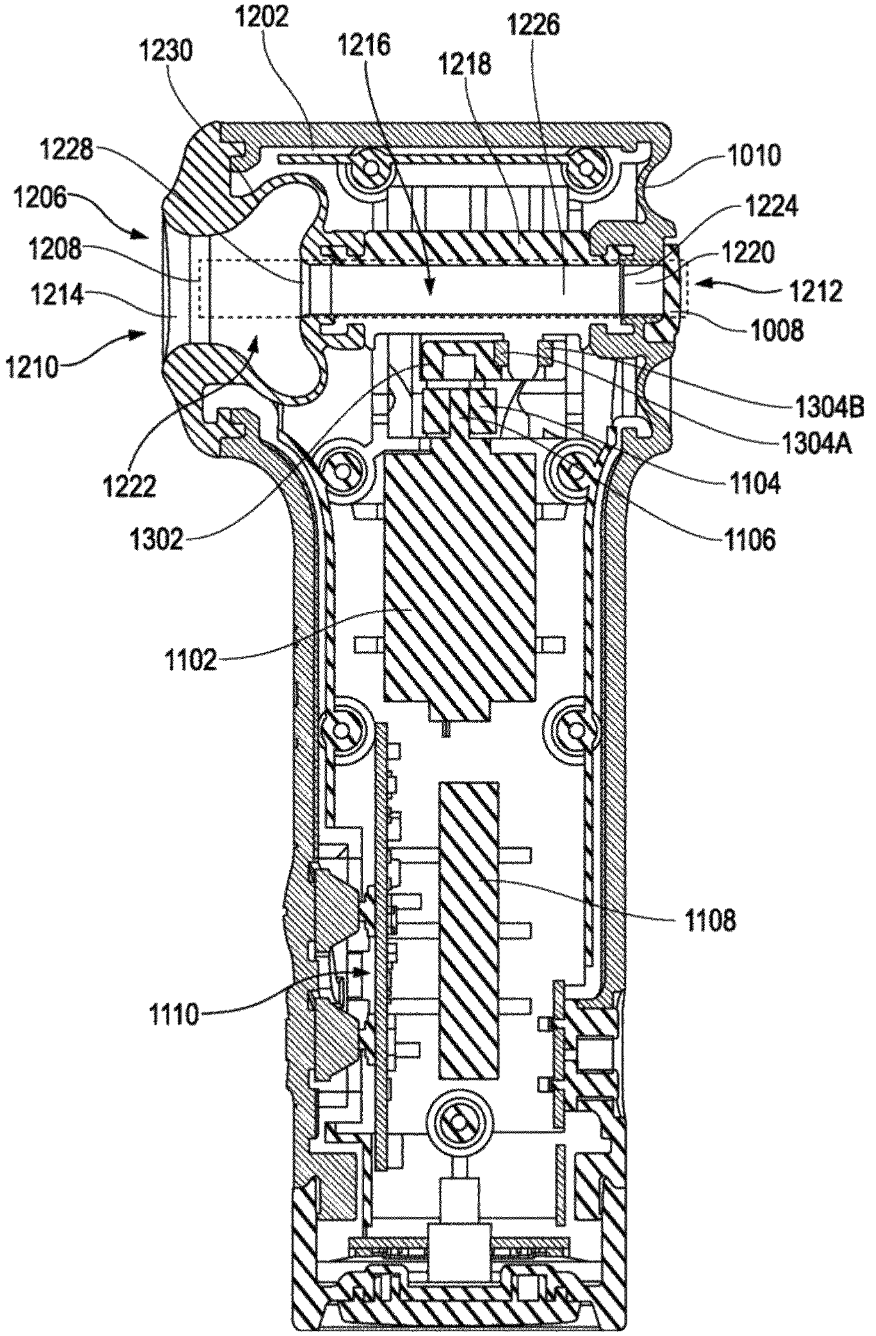
FIG. 14 provides an additional view of the stimulation device depicted in FIG. 13 in which the various elements described above may be seen in a cross-sectional cutaway view.

FIG. 14 provides an additional view of the stimulation device depicted in FIG. 13 in which the various elements described above may be seen in a cross-sectional cutaway view.

Figure 15:
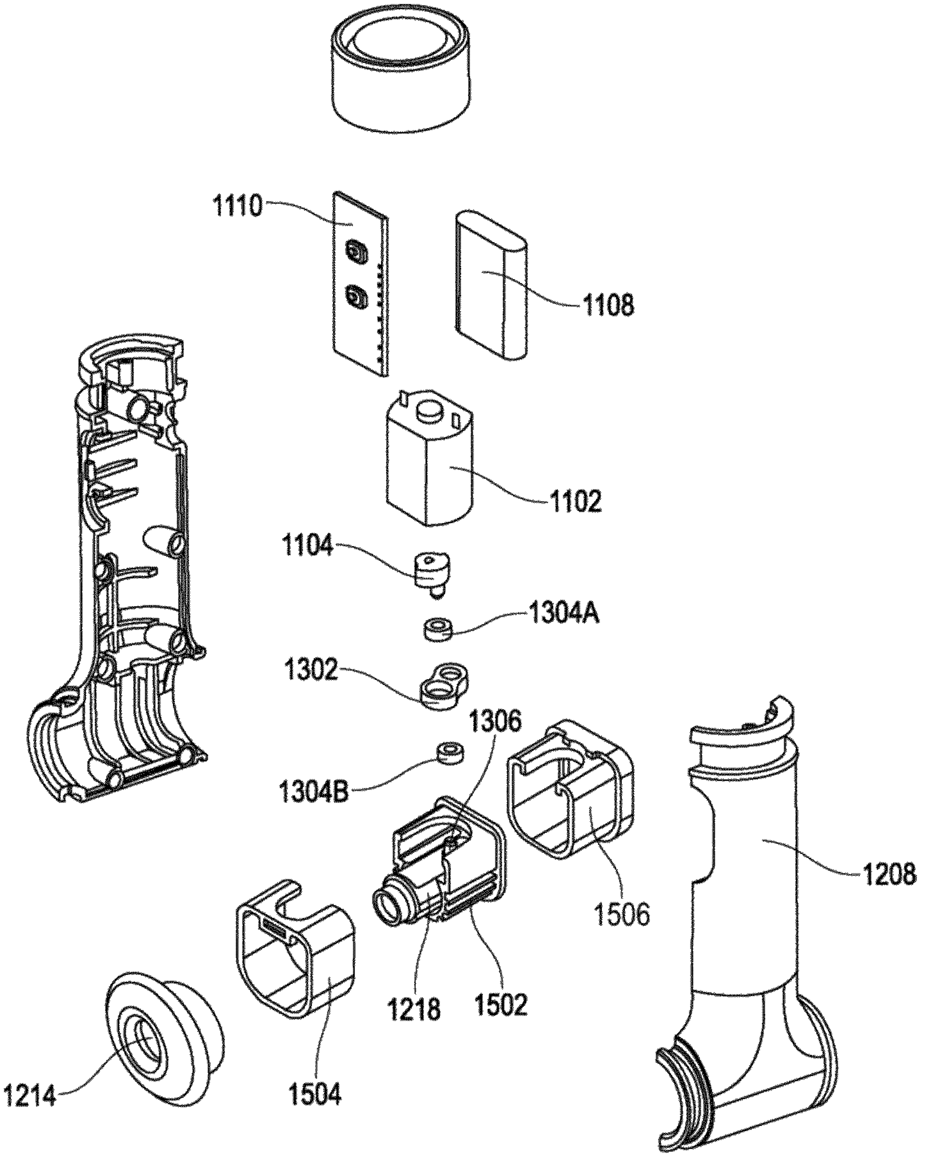
FIG. 15 is an exploded view of a stimulation device in accordance with exemplary embodiments of the present disclosure.
Figure 16:
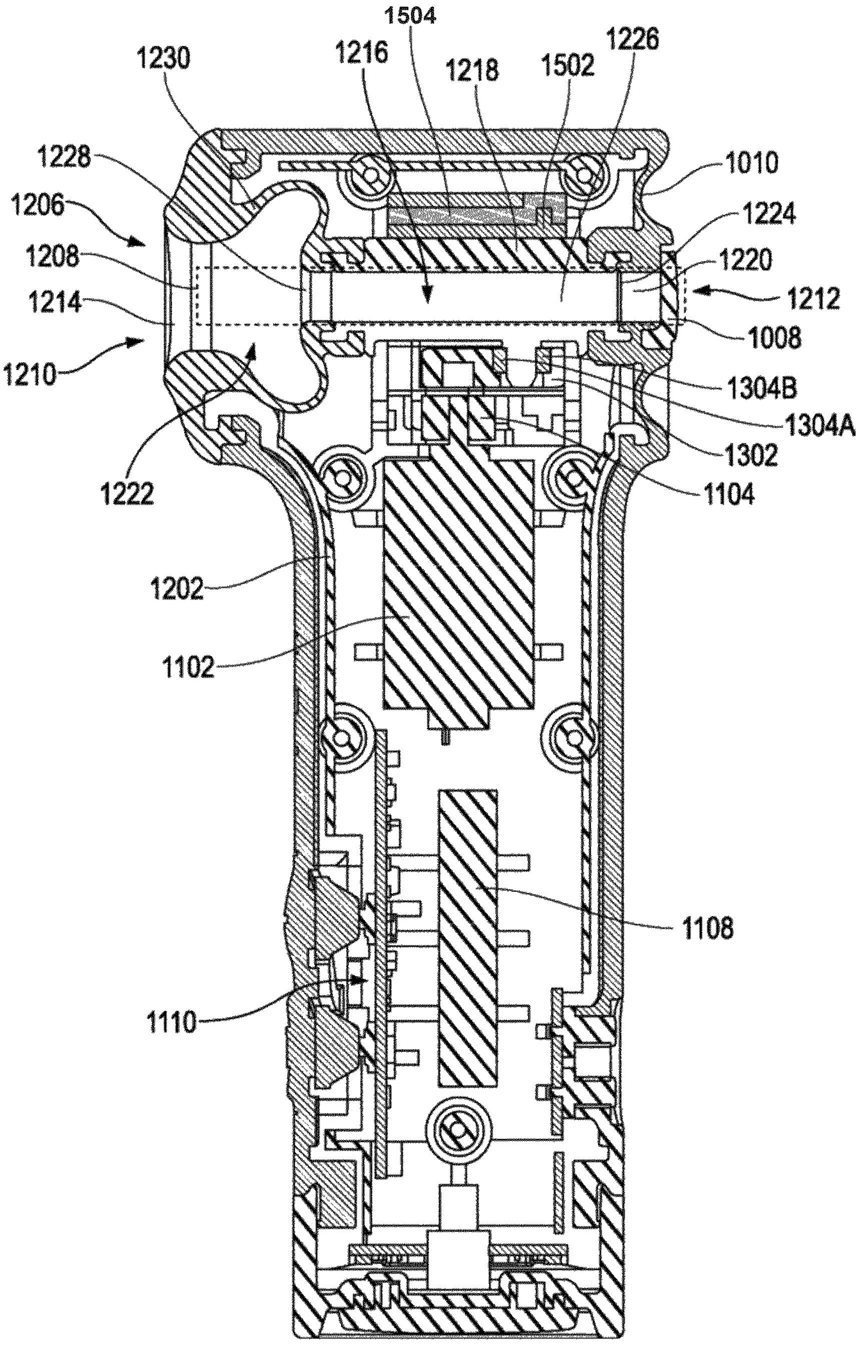
FIG. 16 is a cross-sectional cutaway view of the stimulation device illustrated in FIG. 15.

FIG. 15 is an exploded view of a stimulation device in accordance with exemplary embodiments of the present disclosure. FIG. 16 is a cross-sectional cutaway view showing the same. The embodiment depicted in these figures may be substantially similar to the device whose exterior is shown in FIGS. 10A-10C, however, the exterior of FIGS. 10A-10C may have other components, as described herein and the elements of FIGS. 15 and 16 may have other exteriors.

Referring to FIGS. 15 and 16, the head element may include an opening cap 1214, a support for receiving the opening cap 1214. The support may be formed of a support cover component 1504 and a support base component 1506 that connect together with a guide 1502 disposed therebetween. The guide 1502 defines a space in which the tube element 1218 may freely slide in the reciprocating manner. The mount 1306 may extend from an opening in the guide 1503 and may interface the second bearing 1304B therethrough. In certain embodiments, the support base component 1506 may be formed of a flexible material and/or configured with an elastic structure, with at least a portion of the flexible support base component 1506 embedded within the rigid support cover component 1504. This structural integration is designed to mitigate vibrations induced by the reciprocating movement of the tube element 1218 during operation. The flexible support base component 1506 absorbs and dampens minor deflections or shocks generated when the drive unit forces the tube element 1218 to move linearly, while the rigid support cover component 1504 provides structural stability and defines the overall guiding path, ensuring that the movement of the tube element 1218 remains consistent and precisely aligned. Together, the composite support structure improves operational smoothness, enhances durability, and reduces noise or discomfort caused by undesired lateral oscillations.

Figure 17:
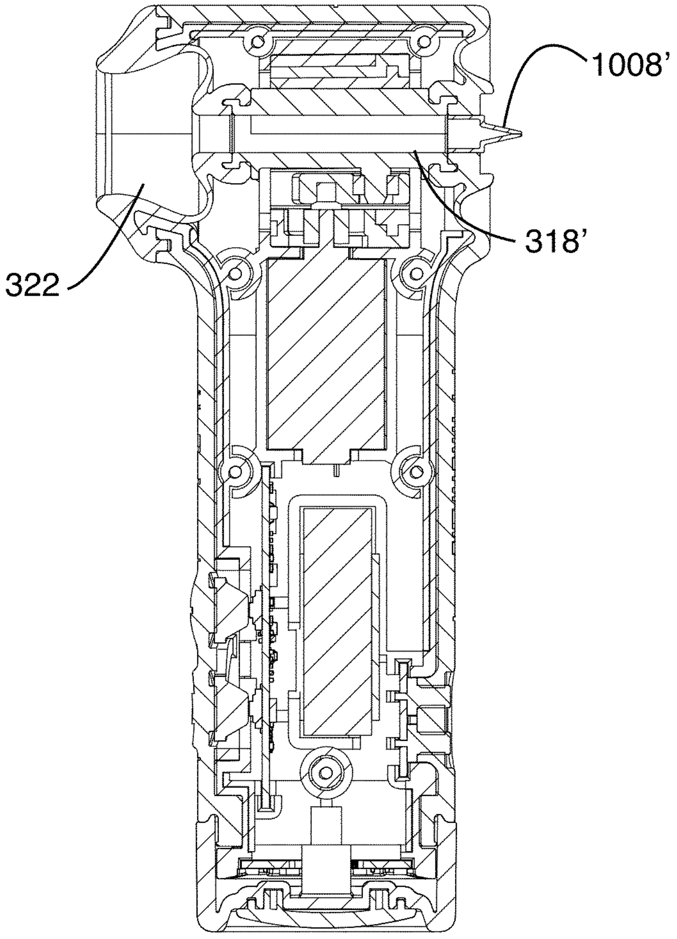
FIG. 17 is a cross-sectional view illustrating a sexual stimulation device in accordance with embodiments of the present disclosure in which the tube element is curved and meets the cavity to form a horn shape.

FIG. 17 is a cross-sectional view illustrating a sexual stimulation device in accordance with embodiments of the present disclosure in which the tube element 318' (modified from the depiction of the tube element 318 of FIG. 3A) is curved and meets the cavity 322 to form a horn shape in cross-sectional view. Moreover, as can be appreciated from this figure, the check valve 1008' (modified from the depiction as element 1008 in FIG. 17) contributes to the horn shape of the tube element 318' by constituting a one-way duckbill valve. This duckbill one-way check valve 1008' may be made of silicone, or a similar synthetic rubber, and may serve to permit air to exit therefrom with a fluttering motion that may itself be used to produce sexual stimulation. However, under normal conditions in which excess air is not extruded therefrom, the check valve 1008' may remain closed to prevent ambient air from entering therefrom.

While the present invention has been described in detail with reference to exemplary embodiments, it will be understood by those skilled in the art that various changes in form and detail may be made without departing from the spirit and scope of the invention. Accordingly, the scope of the invention should not necessarily be limited by the embodiments set forth above.

What is claimed is:

1. A sexual stimulation device, comprising:

a pressure field generator, comprising:

a first opening configured to stimulate an erogenous zone of a user's body;

a cavity in fluid communication with the first opening; and a tube extending from the cavity, the tube being rigid;

wherein the cavity and the tube together form an airflow channel extending substantially linearly through the pressure field generator from the first opening to a second opening at an exterior of the sexual stimulation device, the airflow channel provides a continuous open passage at least in a direction from the first opening to the second opening; and a drive unit coupled to the tube of the pressure field generator and configured to change a volume of the airflow channel by mechanically driving the tube and generate alternating pressure variations relative to an ambient pressure at the first opening so as to provide pneumatic pulse stimulation to the erogenous zone of the user's body, wherein the pneumatic pulse stimulation is thereby produced by the mechanical driving of the tube that connects the airflow channel from the cavity and first opening to the second opening.

2. The sexual stimulation device according to claim 1, wherein the airflow channel is configured to produce a maximum positive pressure alternating with a minimum negative pressure and an absolute value of the minimum negative pressure is greater than an absolute value of the maximum positive pressure.

3. The sexual stimulation device according to claim 1, further comprising a handle enclosing the drive unit, wherein the airflow channel extends in a direction substantially perpendicular to a longitudinal axis of the handle.

4. The sexual stimulation device according to claim 1, further comprising a handle proximate to the pressure field generator, wherein the airflow channel extends in a direction that forms an angle with a longitudinal axis of the handle.

5. The sexual stimulation device according to claim 1, wherein the airflow channel is configured to receive insertion of a penis of the user.

6. The sexual stimulation device according to claim 1, wherein the first opening of the pressure field generator is configured to receive a clitoris of the user.

7. The sexual stimulation device according to claim 1, wherein a cross-sectional area of the airflow channel changes along its axial direction.

8. The sexual stimulation device according to claim 1, wherein the drive unit is configured to move the tube towards and away from the cavity so as to reduce and enlarge a volume of the cavity and thereby create an alternating positive and negative field at the first opening of the cavity.

9. The sexual stimulation device of claim 1, wherein the airflow channel extending from the first opening to the second opening is coaxial with the cavity.

10. The sexual stimulation device of claim 1, wherein the drive unit changes the volume of the airflow channel by driving the tube in the linear direction of the airflow channel while the tube maintains a constant length in the linear direction.

11. The sexual stimulation device of claim 1, wherein the drive unit is further configured to reduce pressure at the first opening below an ambient pressure.

12. The sexual stimulation device according to claim 1, wherein the airflow channel includes a check valve configured to permit airflow substantially unidirectionally from within the airflow channel toward the exterior of the sexual stimulation device.

13. The sexual stimulation device according to claim 12, wherein the first opening is disposed at a first end of the airflow channel and the check valve is detachably disposed at the second opening of the airflow channel, opposite to the first end of the airflow channel.

14. The sexual stimulation device according to claim 12, wherein the check valve includes an adjustable mechanism disposed along an outer periphery thereof and configured to regulate an amount of air discharged from within the airflow channel to the exterior of the sexual stimulation device though the check valve.

15. The sexual stimulation device according to claim 12, wherein the check valve comprises a notch through which fluid flows from within the airflow channel to the exterior of the sexual stimulation device.

16. The sexual stimulation device according to claim 12, wherein the check valve is positioned at a location spaced apart from the first opening, rather than adjacent to the first opening.

17. The sexual stimulation device according to claim 12, wherein the check valve comprises a conical port structure configured to permit unidirectional airflow from within the airflow channel to the exterior of the sexual stimulation device.

18. The sexual stimulation device according to claim 12, wherein the check valve is replaceable.

19. The sexual stimulation device according to claim 1, wherein the drive unit is an electromagnetic drive mechanism comprising one or more coils and a magnetic ring configured to move in response to a magnetic field generated by the one or more coils so as to vary a volume of the airflow channel.

20. The sexual stimulation device according to claim 19, wherein the magnetic ring circumscribes the airflow channel, and the one or more coils are arranged circumferentially around the magnetic ring and positioned outside the airflow channel.

21. The sexual stimulation device according to claim 1, wherein the airflow channel comprises:

a first end region including the first opening; and a second end region accommodating a stimulation tip, the stimulation tip being supported by a flexible base disposed at the second end region;

wherein the drive unit is further configured to drive the stimulation tip to pulsate while changing the volume of the airflow channel.

22. The sexual stimulation device according to claim 21, wherein the stimulation tip comprises a check valve.

23. The sexual stimulation device according to claim 1, wherein the drive unit comprises:

a rotary motor having an output shaft;

a connecting rod having a first end coupled to the tube of the airflow channel; and a crankshaft connecting the output shaft of the rotary motor to a second end of the connecting rod.

24. The sexual stimulation device according to claim 23, further comprising a guide constraining the tube to move in a linear reciprocating motion.

25. The sexual stimulation device according to claim 1, wherein a cross-sectional area of the airflow channel changes at a junction between the cavity and the tube of the pressure field generator, the change in the cross-sectional area being a discontinuous change having a horn shape.

26. The sexual stimulation device according to claim 25, wherein the horn shape of the airflow channel is configured to modulate airflow characteristics within the airflow channel by altering flow velocity generated by volume changes in the airflow channel, thereby focusing airflow pulses toward the first opening to intensify stimulation at the erogenous zone of the user's body.

27. A sexual stimulation device, comprising:

a head unit including a flexible internal wall defining a cavity therein;

a rigid tube connected to the flexible internal wall and in fluid communication with the cavity; and a drive unit configured to move the rigid tube into and away from the cavity so as to reduce and enlarge a volume of the cavity defined by the flexible internal wall, wherein the movement of the rigid tube causes the flexible internal wall to deform to vary the volume of the cavity, thereby generating an alternating pressure field at an opening of the cavity that is configured to receive an erogenous zone of a user's body, and wherein the rigid tube defines a through passage having a substantially constant internal volume and is configured to provide a continuous airflow path from the cavity to an exterior of the sexual stimulation device.

28. The sexual stimulation device of claim 27, further comprising a check valve at an end of the rigid tube opposite to where it contacts the cavity configured to allow air to exit therethrough but not enter therethrough.

29. The sexual stimulation device of claim 27, wherein the flexible internal wall of the head unit extends to wrap around an exterior of the head unit.

30. The sexual stimulation device of claim 27, wherein the flexible internal wall of the head unit extends to line an interior of the rigid tube.

31. The sexual stimulation device of claim 27, wherein the alternating pressure field is such that pressure at an opening of the cavity is lower than an ambient pressure.

* * * * *